(12) United States Patent
Vincent et al.

(10) Patent No.: US 9,475,034 B2
(45) Date of Patent: Oct. 25, 2016

(54) NONWOVEN FIBROUS WEBS CONTAINING CHEMICALLY ACTIVE PARTICULATES AND METHODS OF MAKING AND USING SAME

(75) Inventors: Bernard Vincent, Rueil Malmaison (FR); Lahoussaine Lalouch, Noyon (FR); Tien T. Wu, Woodbury, MN (US); Eric M. Moore, Roseville, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 418 days.

(21) Appl. No.: 13/640,133

(22) PCT Filed: Apr. 14, 2011

(86) PCT No.: PCT/US2011/032492
§ 371 (c)(1),
(2), (4) Date: Oct. 9, 2012

(87) PCT Pub. No.: WO2011/133396
PCT Pub. Date: Oct. 27, 2011

(65) Prior Publication Data
US 2013/0030340 A1    Jan. 31, 2013

Related U.S. Application Data

(60) Provisional application No. 61/326,730, filed on Apr. 22, 2010.

(51) Int. Cl.
*B32B 5/02* (2006.01)
*B01J 20/28* (2006.01)
(Continued)

(52) U.S. Cl.
CPC ........ *B01J 20/28028* (2013.01); *B01D 39/163* (2013.01); *D04H 1/407* (2013.01);
(Continued)

(58) Field of Classification Search
USPC .......................................... 602/41–43, 44–52
See application file for complete search history.

(56) References Cited

U.S. PATENT DOCUMENTS

| 1,975,504 A | 10/1934 | Formhals |
| 3,516,941 A | 6/1970 | Matson |

(Continued)

FOREIGN PATENT DOCUMENTS

| JP | 2002-235268 | 8/2002 |
| JP | 2003-275518 | 9/2003 |

(Continued)

*Primary Examiner* — Kim M Lewis
(74) *Attorney, Agent, or Firm* — James A. Baker

(57) ABSTRACT

Nonwoven fibrous webs including a multiplicity of randomly oriented discrete fibers and a multiplicity of chemically active particulates secured to the web, and methods of making and using same. In some embodiments, more than 0% and less than 10% wt. of the nonwoven fibrous web is made of multi-component fibers having at least a first region exhibiting a first melting temperature and a second region exhibiting a second melting temperature greater than the first melting temperature. In other embodiments, the discrete fibers include a first population of monocomponent thermoplastic fibers having a first melting temperature, and a second population of monocomponent fibers having a second melting temperature greater than the first melting temperature. In certain embodiments, at least some of the particulates are bonded to the fibers. In other embodiments, at least some of the particulates are secured within interstices of the fibrous web, without substantial bonding to the fibers.

18 Claims, 7 Drawing Sheets

(51) Int. Cl.
  *B01D 39/16* (2006.01)
  *D04H 1/541* (2012.01)
  *D04H 1/407* (2012.01)
  *D04H 1/413* (2012.01)
  *D04H 1/4374* (2012.01)
  *D04H 1/4382* (2012.01)
  *C02F 1/28* (2006.01)
  *C02F 1/42* (2006.01)

(52) U.S. Cl.
  CPC .......... *D04H 1/413* (2013.01); *D04H 1/4374* (2013.01); *D04H 1/4382* (2013.01); *D04H 1/541* (2013.01); *B01D 2239/0216* (2013.01); *B01D 2239/0407* (2013.01); *B01D 2239/065* (2013.01); *B01D 2239/0654* (2013.01); *C02F 1/28* (2013.01); *C02F 1/42* (2013.01); *Y10T 428/24331* (2015.01); *Y10T 442/10* (2015.04); *Y10T 442/20* (2015.04); *Y10T 442/2484* (2015.04); *Y10T 442/2508* (2015.04); *Y10T 442/2525* (2015.04); *Y10T 442/2861* (2015.04); *Y10T 442/2877* (2015.04); *Y10T 442/2885* (2015.04); *Y10T 442/2893* (2015.04); *Y10T 442/291* (2015.04); *Y10T 442/2918* (2015.04); *Y10T 442/3846* (2015.04); *Y10T 442/494* (2015.04); *Y10T 442/603* (2015.04); *Y10T 442/655* (2015.04)

(56) References Cited

U.S. PATENT DOCUMENTS

| | | | |
|---|---|---|---|
| 3,802,817 A | 4/1974 | Matsuki et al. | |
| 3,874,886 A | 4/1975 | Levecque et al. | |
| 4,100,324 A | 7/1978 | Anderson et al. | |
| 4,118,531 A | 10/1978 | Hauser | |
| 4,363,646 A | 12/1982 | Torobin | |
| 4,536,361 A | 8/1985 | Torobin | |
| 4,552,603 A | 11/1985 | Harris, Jr. et al. | |
| 4,640,810 A | 2/1987 | Laursen et al. | |
| 4,729,371 A | 3/1988 | Krueger et al. | |
| 4,818,464 A | 4/1989 | Lau | |
| 5,114,787 A | 5/1992 | Chaplin et al. | |
| 5,167,765 A | 12/1992 | Nielsen et al. | |
| 5,227,107 A | 7/1993 | Dickenson et al. | |
| 5,277,976 A | 1/1994 | Hogle et al. | |
| 5,332,426 A | 7/1994 | Tang et al. | |
| 5,486,410 A | 1/1996 | Groeger et al. | |
| 5,496,507 A | 3/1996 | Angadjivand et al. | |
| 5,662,728 A | 9/1997 | Groeger | |
| 5,674,339 A | 10/1997 | Groeger et al. | |
| 5,972,808 A | 10/1999 | Groeger et al. | |
| 6,057,256 A | 5/2000 | Krueger et al. | |
| 6,114,017 A | 9/2000 | Fabbricante et al. | |
| 6,183,670 B1 | 2/2001 | Torobin et al. | |
| 6,207,237 B1 * | 3/2001 | Haffner | A61F 13/4902 427/389.9 |
| 6,315,806 B1 | 11/2001 | Torobin et al. | |
| 6,382,526 B1 | 5/2002 | Reneker et al. | |
| 6,607,624 B2 | 8/2003 | Berrigan et al. | |
| 6,743,273 B2 | 6/2004 | Chung et al. | |
| 6,800,226 B1 | 10/2004 | Gerking | |
| 6,808,664 B2 | 10/2004 | Falk et al. | |
| 6,861,025 B2 | 3/2005 | Erickson et al. | |
| 7,491,354 B2 | 2/2009 | Andersen | |
| 7,695,660 B2 | 4/2010 | Berrigan et al. | |
| 2002/0100548 A1 | 8/2002 | Minami et al. | |
| 2008/0038976 A1 | 2/2008 | Berrigan et al. | |
| 2010/0092746 A1 | 4/2010 | Coant et al. | |
| 2010/0285101 A1 * | 11/2010 | Moore et al. | 424/445 |
| 2012/0149273 A1 | 6/2012 | Moore et al. | |

FOREIGN PATENT DOCUMENTS

| | | |
|---|---|---|
| JP | 2006-104635 | 4/2006 |
| WO | WO 00/12194 | 3/2000 |
| WO | WO 00/29658 | 5/2000 |
| WO | WO 03/015914 | 2/2003 |
| WO | WO 2008/085545 | 7/2008 |
| WO | WO 2009-088647 | 7/2009 |
| WO | WO 2009/088648 | 7/2009 |

* cited by examiner

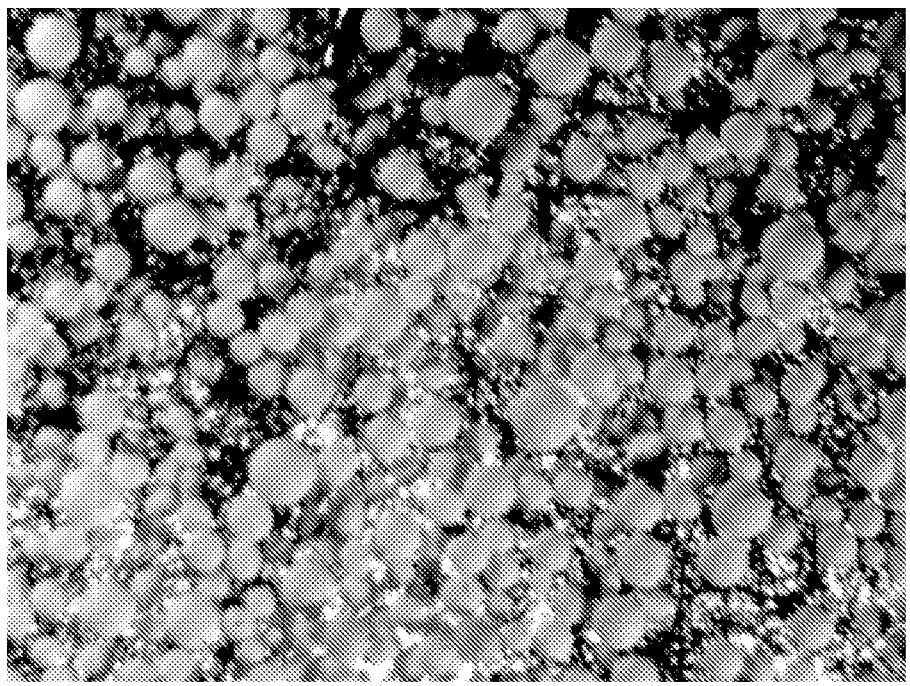
Fig. 6C
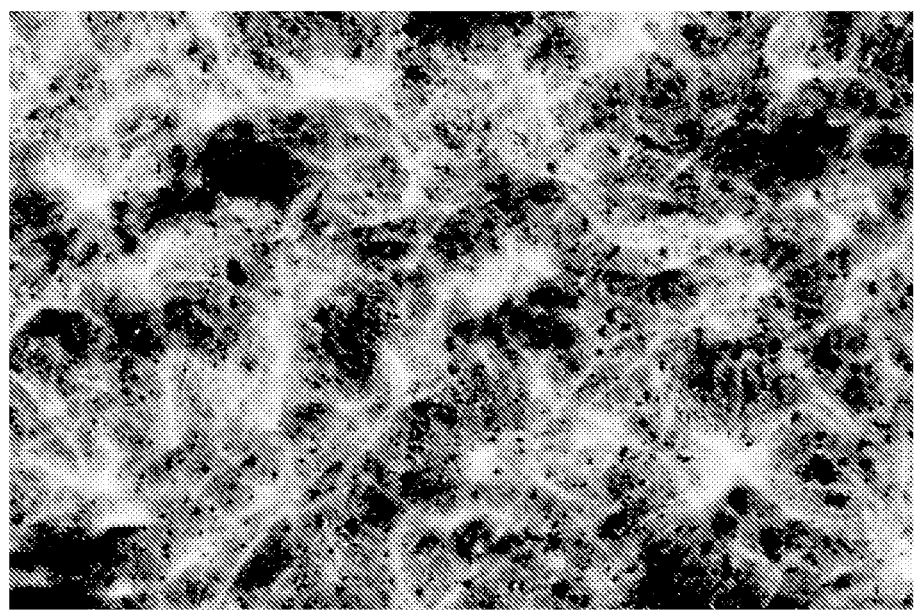
Fig. 6D  500μm

NONWOVEN FIBROUS WEBS CONTAINING CHEMICALLY ACTIVE PARTICULATES AND METHODS OF MAKING AND USING SAME

CROSS REFERENCE TO RELATED APPLICATION

This application claims the benefit of U.S. Provisional Patent Application No. 61/326,730, filed Apr. 22, 2010, the disclosure of which is incorporated by reference herein in its entirety.

TECHNICAL FIELD

The present disclosure relates to nonwoven fibrous webs including chemically active particulates, and more specifically, to fluid filtration articles incorporating nonwoven fibrous webs including chemically active particulates, and methods of making and using such articles and webs.

BACKGROUND

Numerous types of fluid filtration systems, e.g. such as those used for home water filtration and as gas filtration respirators, are commercially available. Nonwoven fibrous webs are frequently used as a filtration medium in such fluid filtration systems. Such nonwoven fibrous webs may include two or more kinds of fibers, for example, two different populations of microfibers, each having a different average diameter, so that the nonwoven fibrous web can filter particulates of a broad range of sizes. Generally the different populations of fibers are intermixed within a single-layer web.

Nonwoven fibrous webs can be formed by a variety of techniques including carding, garneting, air-laying, wet-laying, melt blowing, spunbonding, and stitch bonding. Further processing of a nonwoven may be necessary to add properties such as strength, durability, and texture. Examples of further processing include calendering, hydroentangling, needle tacking, resin bonding, thermo-bonding, ultrasonic welding, embossing, and laminating. In some nonwoven fibrous webs useful as a filtration medium, it has been found to be advantageous to incorporate sorbent particulates, such as activated carbon, within the web. It is also known to bind sorbent particulates to the fibers of a nonwoven fibrous web by use of a separate binder material, thereby providing particulate-loaded articles suitable for use in some fluid filtration applications.

SUMMARY

There is an ongoing need to provide compact and low cost fluid filtration articles, for example, water filters for home use, or air filters for use as respirators or as filters for heating, ventilation and cooling (HVAC) applications. There is also a need to provide fluid filtration articles that have high loadings of chemically active particulates, such as absorbent and/or adsorbent particulates, without increasing pressure drop across the fluid filtration system. It is also desirable to provide particulate-loaded nonwoven fibrous webs which effectively retain the particulates within the fiber nonwoven fibrous web, thereby preventing release of particulates into the permeating fluid when used as fluid filtration articles. In addition, there is a continuing need to provide fluid filtration articles having improved service life and filtration effectiveness.

Thus, in one aspect, the disclosure describes a nonwoven fibrous web comprising a plurality of randomly oriented discrete fibers and a plurality of chemically active particulates, the randomly oriented discrete fibers comprising multi-component fibers that include at least a first region having a first melting temperature and a second region having a second melting temperature, wherein the first melting temperature is less than the second melting temperature. The multi-component fibers comprise more than 0% and less than 10% wt. of the nonwoven fibrous web. At least a portion of the chemically active particulates are bonded to the at least first region of at least a portion of the multi-component fibers, and at least a portion of the discrete fibers are bonded together at a plurality of intersection points with the first region of the multi-component fibers.

In some exemplary embodiments, the multi-component fibers comprise greater than 0% and less than 10% by weight of the total weight of discrete fibers. In certain exemplary embodiments, the multi-component fibers are bi-component fibers. In additional exemplary embodiments, the multi-component fibers comprise a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof.

In another aspect, the disclosure describes a nonwoven fibrous web comprising a plurality of randomly oriented discrete fibers and a plurality of chemically active particulates, the randomly oriented discrete fibers comprising a first population of monocomponent discrete thermoplastic fibers having a first melting temperature, and a second population of monocomponent discrete fibers having a second melting temperature greater than the first melting temperature. At least a portion of the chemically active particulates are bonded to at least a portion of the first population of monocomponent discrete fibers, and at least a portion of the first population of monocomponent discrete fibers is bonded to at least a portion of the second population of monocomponent discrete fibers.

In some exemplary embodiments, the first population of monocomponent discrete fibers comprises greater than 0% and less than 10% wt. of the nonwoven fibrous web.

In certain exemplary embodiments, the first population of monocomponent discrete fibers comprises greater than 0% and less than 10% wt. of the plurality of randomly oriented discrete fibers.

In certain exemplary embodiments, the first population of monocomponent discrete fibers comprises a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof.

In any of the foregoing embodiments, the first melting temperature may be selected to be at least 50° C., and the second melting temperature may be selected to be at least 10° C. greater than the first melting temperature. In any of the foregoing embodiments, the first melting temperature may be selected to be at least 100° C., and the second melting temperature may be selected to be at least 30° C. greater than the first melting temperature.

In yet another aspect, the disclosure describes a nonwoven fibrous web comprising a plurality of randomly oriented discrete fibers entangled to form a cohesive fibrous web comprising a plurality of interstitial voids, and a plurality of chemically active particulates distributed within the cohesive fibrous web. Each interstitial void defines a void volume having at least one opening defined by at least two overlapping fibers, and the at least one opening has a median dimension. The chemically active particulates exhibit a volume less than the void volume, and a median particulate size greater than the median dimension. In some exemplary embodiments, the chemically active particulates are not substantially bonded to the fibers. In certain exemplary embodiments, the fibers are not substantially bonded to each other.

In any of the foregoing exemplary embodiments, at least a portion of the randomly oriented discrete fibers is selected from natural fibers, non-thermoplastic polymeric fibers, carbon fibers, ceramic fibers, metal fibers, and combinations thereof. In any of the foregoing embodiments, at least a portion of the randomly oriented discrete fibers comprises polypropylene, polyethylene, polyester, polyethylene terephthalate, polybutylene terephthalate, polyamide, polyurethane, polybutene, polylactic acid, polyvinyl alcohol, polyphenylene sulfide, polysulfone, fluid crystalline polymer, polyethylene-co-vinylacetate, polyacrylonitrile, cyclic polyolefin, polyoxymethylene, polyolefinic thermoplastic elastomers, or a combination thereof. In any of the foregoing embodiments, at least 10% wt. of the nonwoven fibrous web comprises chemically active particulates.

Additionally, in any of the foregoing exemplary embodiments, the chemically active particulates are selected from sorbent particulates (e.g. adsorbent particulates, absorbent particulates, and the like), biocide particulates, microcapsules, and combinations thereof. In any of the foregoing embodiments, the chemically active particulates are selected from activated carbon particulates, activated alumina particulates, silica gel particulates anion exchange resin particulates, cation exchange resin particulates, molecular sieve particulates, diatomaceous earth particulates, anti-microbial compound particulates, metal particulates, and combinations thereof. In any of the foregoing embodiments, the chemically active particulates are distributed throughout an entire thickness of the nonwoven fibrous web. However, in some of the foregoing embodiments, the chemically active particulates are preferentially on a major surface of the nonwoven fibrous web.

In any of the foregoing exemplary embodiments, the nonwoven fibrous web is preferably substantially free of any additional binder. However, in some of the foregoing embodiments, the nonwoven fibrous web further comprises a binder coating covering at least a portion of the plurality of randomly oriented discrete fibers. In certain presently preferred exemplary embodiments, the binder does not substantially occlude the surface of the chemically active particulates.

Any of the foregoing embodiments of a nonwoven fibrous web may optionally further comprise a support layer selected from the group consisting of a screen a scrim, a mesh, a nonwoven fabric, a woven fabric, a knitted fabric, a foam layer, a porous film, a perforated film, an array of filaments, a melt-fibrillated fibrous web, a meltblown fibrous web, a spun bond fibrous web, an air-laid fibrous web, a wet-laid fibrous web, a carded fibrous web, a hydro-entangled fibrous web, and combinations thereof. Any of the foregoing embodiments of a nonwoven fibrous web may optionally further comprise a fibrous cover layer comprising at least one of a plurality of microfibers, a plurality of sub-micrometer fibers, and combinations thereof. In certain exemplary embodiments, the fibrous cover layer comprises a population of sub-micrometer fibers having a median fiber diameter of less than 1 µm formed by melt blowing, melt spinning, electrospinning, plexifilament formation, gas jet fibrillation, fiber splitting, or a combination thereof.

Any of the foregoing exemplary embodiments of nonwoven fibrous webs comprising chemically active particulates may be used to make an article selected from a gas filtration article, a liquid filtration article, a surface cleaning article, an insulation article, a cellular growth support article, a drug delivery article, a personal hygiene article, and a wound dressing article. In certain presently preferred embodiments, the nonwoven fibrous web of any of the foregoing embodiments may be used to make a fluid filtration article comprising a fluid-impermeable housing surrounding the nonwoven fibrous web, the housing comprising at least one fluid inlet in fluid communication with a first major surface of the nonwoven fibrous web, and at least one fluid outlet in fluid communication with a second major surface of the nonwoven fibrous web opposite the first major surface of the nonwoven fibrous web.

In a further aspect, the disclosure describes a method of making a nonwoven fibrous web according to any of the foregoing embodiments, the method comprising providing a forming chamber having an upper end and a lower end, introducing a plurality of discrete fibers into the upper end of the forming chamber, introducing a plurality of chemically active particulates into the forming chamber, mixing the discrete fibers with the chemically active particulates within the forming chamber to form a fibrous particulate mixture, transporting the fibrous particulate mixture to the lower end of the forming chamber to form a nonwoven fibrous web, and securing the chemically active particulates to the nonwoven fibrous web.

In certain exemplary embodiments, transporting the fibrous particulate mixture to the lower end of the forming chamber to form a nonwoven fibrous web comprises dropping the discrete fibers into the forming chamber and permitting the fibers to drop through the forming chamber under the force of gravity. In other exemplary embodiments, transporting the fibrous particulate mixture to the lower end of the forming chamber to form a nonwoven fibrous web comprises dropping the discrete fibers into the forming chamber and permitting the fibers to drop through the forming chamber under the forces of gravity and a vacuum force applied to the lower end of the forming chamber.

In some exemplary embodiments wherein more than 0% and less than 10% wt. of the nonwoven fibrous web, more preferably more than 0% and less than 10% wt. of the discrete fibers, is comprised of multi-component fibers comprising at least a first region having a first melting temperature and a second region having a second melting temperature wherein the first melting temperature is less than the second melting temperature, securing the chemically active particulates to the nonwoven fibrous web comprises heating the multi-component fibers to a temperature of at least the first melting temperature and less than the second melting temperature, whereby at least a portion of the chemically active particulates are bonded to the at least first region of at least a portion of the multi-component fibers, and at least a portion of the discrete fibers are bonded together at a plurality of intersection points with the first region of the multi-component fibers.

In other exemplary embodiments wherein the plurality of discrete fibers includes a first population of monocomponent discrete thermoplastic fibers having a first melting temperature, and a second population of monocomponent discrete fibers having a second melting temperature greater than the first melting temperature, securing the chemically active particulates to the nonwoven fibrous web comprises heating the thermoplastic fibers to a temperature of at least the first melting temperature and less than the second melting temperature, whereby at least a portion of the chemically active particulates are bonded to at least a portion of the first population of monocomponent discrete fibers, and further wherein at least a portion of the first population of monocomponent discrete fibers is bonded to at least a portion of the second population of monocomponent discrete fibers.

In some exemplary embodiments comprising a first population of monocomponent discrete thermoplastic fibers having a first melting temperature and a second population of monocomponent discrete fibers having a second melting temperature greater than the first melting temperature, preferably more than 0% and less than 10% wt. of the nonwoven fibrous web, more preferably more than 0% and less than 10% wt. of the discrete fibers, is comprised of the first population of monocomponent discrete thermoplastic.

In certain exemplary embodiments, securing the chemically active particulates to the nonwoven fibrous web comprises heating the first population of monocomponent discrete thermoplastic fibers to a temperature of at least the first melting temperature and less than the second melting temperature, whereby at least a portion of the chemically active particulates are bonded to at least a portion of the first population of monocomponent discrete thermoplastic fibers, and at least a portion of the discrete fibers are bonded together at a plurality of intersection points with the first population of monocomponent discrete thermoplastic fibers.

In any of the foregoing exemplary embodiments, securing the chemically active particulates to the nonwoven fibrous web comprises at least one of thermal bonding, autogenous bonding, adhesive bonding, powdered binder binding, hydroentangling, needlepunching, calendering, or a combination thereof. In some of the foregoing embodiments, securing the chemically active particulates to the nonwoven fibrous web comprises entangling the discrete fibers, thereby forming a cohesive nonwoven fibrous web including a plurality of interstitial voids, each interstitial void defining a void volume having at least one opening having a median dimension defined by at least two overlapping fibers, wherein the chemically active particulates exhibit a volume less than the void volume and a median particulate size greater than the median dimension, further wherein the chemically active particulates are not substantially bonded to the discrete fibers and the discrete fibers are not substantially bonded to each other.

In any of the foregoing exemplary embodiments, a liquid may be introduced into the forming chamber to wet at least a portion of the discrete fibers, whereby at least a portion of the chemically active particulates adhere to the wetted discrete fibers in the forming chamber.

In any of the foregoing embodiments, the chemically active particulates may be introduced into the forming chamber at the upper end, at the lower end, between the upper end and the lower end, or a combination thereof. In any of the foregoing embodiments, the nonwoven fibrous web may be formed on a collector, wherein the collector is selected from a screen, a scrim, a mesh, a nonwoven fabric, a woven fabric, a knitted fabric, a foam layer, a porous film, a perforated film, an array of filaments, a melt-fibrillated nanofiber web, a meltblown fibrous web, a spun bond fibrous web, an air-laid fibrous web, a wet-laid fibrous web, a carded fibrous web, a hydro-entangled fibrous web, and combinations thereof.

In other examples of any of the foregoing embodiments, the method further comprises applying a fibrous cover layer overlaying the nonwoven fibrous web, wherein the fibrous cover layer is formed by air-laying, wet-laying, carding, melt blowing, melt spinning, electrospinning, plexifilament formation, gas jet fibrillation, fiber splitting, or a combination thereof. In certain exemplary embodiments, the fibrous cover layer comprises a population of sub-micrometer fibers having a median fiber diameter of less than 1 µm formed by melt blowing, melt spinning, electrospinning, plexifilament formation, gas jet fibrillation, fiber splitting, or a combination thereof.

Exemplary embodiments of the chemically active particulate-loaded nonwoven fibrous webs according to the present disclosure may have structural features that enable their use in a variety of applications, have exceptional adsorbent and/or absorbent properties, exhibit high porosity and permeability due to their low Solidity, and/or be manufactured in a cost-effective manner. Certain exemplary embodiments of the chemically active particulate-loaded nonwoven fibrous webs according to the present disclosure may provide compact and low cost fluid filtration articles, for example, water filters for home use, or air filters for use as respirators or as filters for HVAC applications.

Additionally, in some exemplary embodiments, the chemically active particulate-loaded nonwoven fibrous webs according to the present disclosure may enable the manufacture of fluid filtration articles that have high loadings of chemically active particulates, such as absorbent and/or adsorbent particulates, without increasing pressure drop across the fluid filtration system. Furthermore, some exemplary embodiments of the chemically active particulate-loaded nonwoven fibrous webs of the present disclosure may more effectively retain the particulates within the fiber nonwoven fibrous web without adversely decreasing the chemically active surface area of the particulates by occlusion with a binder material, thereby preventing release of particulates into the permeating fluid when used as fluid filtration articles, while facilitating interaction of the entire chemically active surface area with the permeating fluid, resulting in improved service life and greater filtration effectiveness.

Various aspects and advantages of exemplary embodiments of the disclosure have been summarized. The above Summary is not intended to describe each illustrated embodiment or every implementation of the present invention. The Drawings and the Detailed Description that follow more particularly exemplify certain preferred embodiments using the principles disclosed herein.

BRIEF DESCRIPTION OF THE DRAWINGS

Exemplary embodiments of the present disclosure are further described with reference to the appended drawings, wherein:

FIGS. 6A-6F are micrographs illustrating exemplary embodiments of nonwoven fibrous webs of the present disclosure.

Figure 1:
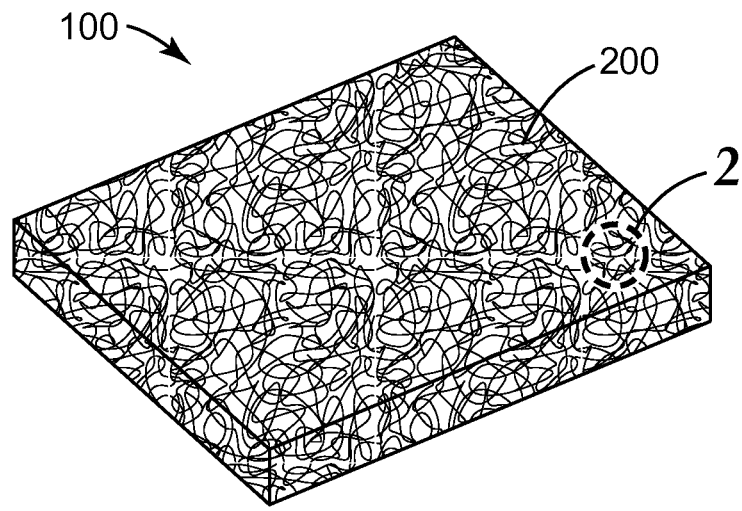
FIG. 1 is a perspective view of an exemplary nonwoven fibrous web of the present disclosure.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this invention.

DETAILED DESCRIPTION

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

GLOSSARY

"Nonwoven fibrous web" means an article or sheet having a structure of individual fibers or filaments, which are interlaid, but not in an identifiable manner as in a knitted fabric. Nonwoven fabrics or webs have been formed from many processes such as for example, meltblowing processes, spunbonding processes, and bonded carded web processes.

"Cohesive nonwoven fibrous web" means a fibrous web characterized by entanglement or bonding of the fibers sufficient to form a self-supporting web.

"Self-supporting" means a web having sufficient coherency and strength so as to be drapable and handleable without substantial tearing or rupture.

"Meltblowing" and "meltblown process" means a method for forming a nonwoven fibrous web by extruding a molten fiber-forming material through a plurality of orifices to form filaments while contacting the filaments with air or other attenuating fluid to attenuate the filaments into fibers, and thereafter collecting the attenuated fibers. An exemplary meltblowing process is taught in, for example, U.S. Pat. No. 6,607,624 (Berrigan et al.).

"Meltblown fibers" means fibers prepared by a meltblowing or meltblown process.

"Spunbonding" and "spun bond process" mean a method for forming a nonwoven fibrous web by extruding molten fiber-forming material as continuous or semi-continuous filaments from a plurality of fine capillaries of a spinneret, and thereafter collecting the attenuated fibers. An exemplary spunbonding process is disclosed in, for example, U.S. Pat. No. 3,802,817 (Matsuki et al.).

"Spun bond fibers" and "spunbonded fibers" mean fibers made using spunbonding or a spun bond process. Such fibers are generally continuous filaments and are entangled or point bonded sufficiently to form a cohesive nonwoven fibrous web such that it is usually not possible to remove one complete spun bond fiber from a mass of such fibers. The fibers may also have shapes such as those described, for example, in U.S. Pat. No. 5,277,976 (Hogle et al.), which describes fibers with unconventional shapes.

"Carding" and "carding process" mean a method of forming a nonwoven fibrous web webs by processing staple fibers through a combing or carding unit, which separates or breaks apart and aligns the staple fibers in the machine direction to form a generally machine direction oriented fibrous nonwoven web. An exemplary carding process is taught in, for example, U.S. Pat. No. 5,114,787 (Chaplin et al.).

"Bonded carded web" refers to nonwoven fibrous web formed by a carding process wherein at least a portion of the fibers are bonded together by methods that include for example, thermal point bonding, autogenous bonding, hot air bonding, ultrasonic bonding, needle punching, calendering, application of a spray adhesive, and the like.

"Autogenous bonding" means bonding between fibers at an elevated temperature as obtained in an oven or with a through-air bonder without application of solid contact pressure such as in point-bonding or calendering.

"Calendering" means a process of passing a nonwoven fibrous web through rollers with application of pressure to obtain a compressed and bonded fibrous nonwoven web. The rollers may optionally be heated.

"Densification" means a process whereby fibers which have been deposited either directly or indirectly onto a filter winding arbor or mandrel are compressed, either before or after the deposition, and made to form an area, generally or locally, of lower porosity, whether by design or as an artifact of some process of handling the forming or formed filter. Densification also includes the process of calendering webs.

"Air-laying" is a process by which a nonwoven fibrous web layer can be formed. In the air-laying process, bundles of small fibers having typical lengths ranging from about 3 to about 52 millimeters (mm) are separated and entrained in an air supply and then deposited onto a forming screen, usually with the assistance of a vacuum supply. The randomly deposited fibers may then be bonded to one another using, for example, thermal point bonding, autogenous bonding, hot air bonding, needle punching, calendering, a spray adhesive, and the like. An exemplary air-laying process is taught in, for example, U.S. Pat. No. 4,640,810 (Laursen et al.).

"Wet-laying" is a process by which a nonwoven fibrous web layer can be formed. In the wet-laying process, bundles of small fibers having typical lengths ranging from about 3 to about 52 millimeters (mm) are separated and entrained in a liquid supply and then deposited onto a forming screen, usually with the assistance of a vacuum supply. Water is typically the preferred liquid. The randomly deposited fibers may by further entangled (e.g., hydro-entangled), or may be bonded to one another using, for example, thermal point bonding, autogeneous bonding, hot air bonding, ultrasonic bonding, needle punching, calendering, application of a spray adhesive, and the like. An exemplary wet-laying and bonding process is taught in, for example, U.S. Pat. No. 5,167,765 (Nielsen et al.). Exemplary bonding processes are also disclosed in, for example, U.S. Patent Application Publication No. 2008/0038976 A1 (Berrigan et al.).

To "co-form" or a "co-forming process" means a process in which at least one fiber layer is formed substantially simultaneously with or in-line with formation of at least one different fiber layer. Webs produced by a co-forming process are generally referred to as "co-formed webs."

"Particulate loading" or a "particle loading process" means a process in which particulates are added to a fiber stream or web while it is forming. Exemplary particulate loading processes are taught in, for example, U.S. Pat. No. 4,818,464 (Lau) and U.S. Pat. No. 4,100,324 (Anderson et al.).

"Die" means a processing assembly for use in polymer melt processing and fiber extrusion processes, including but not limited to meltblowing and the spunbonding process.

"Particulate" and "particle" are used substantially interchangeably. Generally, a particulate or particle means a small distinct piece or individual part of a material in finely divided form. However, a particulate may also include a collection of individual particles associated or clustered together in finely divided form. Thus, individual particulates used in certain exemplary embodiments of the present disclosure may clump, physically intermesh, electro-statically associate, or otherwise associate to form particulates. In certain instances, particulates in the form of agglomerates of individual particulates may be intentionally formed such as those described in U.S. Pat. No. 5,332,426 (Tang et al.).

"Particulate-loaded media" or "particulate-loaded nonwoven fibrous web" means a nonwoven web having an open-structured, entangled mass of discrete fibers, containing particulates enmeshed within or bonded to the fibers, the particulates being chemically active.

"Enmeshed" means that particulates are dispersed and physically held in the fibers of the web. Generally, there is point and line contact along the fibers and the particulates so that nearly the full surface area of the particulates is available for interaction with a fluid.

"Microfibers" means a population of fibers having a population median diameter of at least one micrometer (μm).

"Coarse microfibers" means a population of microfibers having a population median diameter of at least 10 μm.

"Fine microfibers" means a population of microfibers having a population median diameter of less than 10 μm.

"Ultrafine microfibers" means a population of microfibers having a population median diameter of 2 μm or less.

"Sub-micrometer fibers" means a population of fibers having a population median diameter of less than 1 μm.

"Continuous oriented microfibers" means essentially continuous fibers issuing from a die and traveling through a processing station in which the fibers are permanently drawn and at least portions of the polymer molecules within the fibers are permanently oriented into alignment with the longitudinal axis of the fibers ("oriented" as used with respect to fibers means that at least portions of the polymer molecules of the fibers are aligned along the longitudinal axis of the fibers).

"Separately prepared microfibers" means a stream of microfibers produced from a microfiber-forming apparatus (e.g., a die) positioned such that the microfiber stream is initially spatially separate (e.g., over a distance of about 1 inch (25 mm) or more from, but will merge in flight and disperse into, a stream of larger size microfibers.

"Solidity" is a nonwoven web property inversely related to density and characteristic of web permeability and porosity (low Solidity corresponds to high permeability and high porosity), and is defined by the equation:

$$\text{Solidity}(\%) = \frac{[3.937 * \text{Web Basis Weight (g/m}^2)]}{[\text{Web Thickness (mils)} * \text{Bulk Density (g/cm}^3)]}$$

"Web basis weight" is calculated from the weight of a 10 cm×10 cm web sample, and is usually expressed in grams per square meter (gsm).

"Web thickness" is measured on a 10 cm×10 cm web sample using a thickness testing gauge having a tester foot with dimensions of 5 cm×12.5 cm at an applied pressure of 150 Pa.

"Bulk density" is the mass per unit volume of the bulk polymer or polymer blend that makes up the web, taken from the literature.

"Effective Fiber Diameter" or "EFD" is the apparent diameter of the fibers in a fiber web based on an air permeation test in which air at 1 atmosphere and room temperature is passed through a web sample at a specified thickness and face velocity (typically 5.3 cm/sec), and the corresponding pressure drop is measured. Based on the measured pressure drop, the Effective Fiber Diameter is calculated as set forth in Davies, C. N., *The Separation of Airborne Dust and Particulates*, Institution of Mechanical Engineers, London Proceedings, 1B (1952).

"Molecularly same polymer" means polymers that have essentially the same repeating molecular unit, but which may differ in molecular weight, method of manufacture, commercial form, and the like.

"Fluid treatment unit," "fluid filtration article," or "fluid filtration system" means an article containing a fluid filtration medium, such as a porous nonwoven fibrous web. These articles typically include a filter housing for a fluid filtration medium and an outlet to pass treated fluid away from the filter housing in an appropriate manner. The term "fluid filtration system" also includes any related method of separating raw fluid, such as untreated gas or liquid, from treated fluid.

"Void volume" means a percentage or fractional value for the unfilled space within a porous body such as a web or filter, which may be calculated by measuring the weight and volume of a filter, then comparing the filter weight to the theoretical weight of a solid mass of the same constituent material of that same volume.

"Porosity" means a measure of void spaces in a material. Size, frequency, number, and/or interconnectivity of pores and voids contribute the porosity of a material.

"Layer" means a single stratum formed between two major surfaces. A layer may exist internally within a single web, e.g., a single stratum formed with multiple strata in a single web have first and second major surfaces defining the thickness of the web. A layer may also exist in a composite article comprising multiple webs, e.g., a single stratum in a first web having first and second major surfaces defining the thickness of the web, when that web is overlaid or underlaid by a second web having first and second major surfaces defining the thickness of the second web, in which case each of the first and second webs forms at least one layer. In addition, layers may simultaneously exist within a single web and between that web and one or more other webs, each web forming a layer.

"Adjoining" with reference to a particular first layer means joined with or attached to another, second layer, in a position wherein the first and second layers are either next to (i.e., adjacent to) and directly contacting each other, or contiguous with each other but not in direct contact (i.e., there are one or more additional layers intervening between the first and second layers).

"Particulate density gradient," "sorbent density gradient," and "fiber population density gradient" mean that the amount of particulate, sorbent or fibrous material within a particular fiber population (e.g., the number, weight or volume of a given material per unit volume over a defined area of the web) need not be uniform throughout the nonwoven fibrous web, and that it can vary to provide more material in certain areas of the web and less in other areas.

Various exemplary embodiments of the disclosure will now be described with particular reference to the Drawings. Exemplary embodiments of the invention may take on various modifications and alterations without departing from the spirit and scope of the disclosure. Accordingly, it is to be understood that the embodiments of the invention are not to be limited to the following described exemplary embodiments, but is to be controlled by the limitations set forth in the claims and any equivalents thereof.

A. Nonwoven Fibrous Webs Including Chemically Active Particulates

Figure 2A:
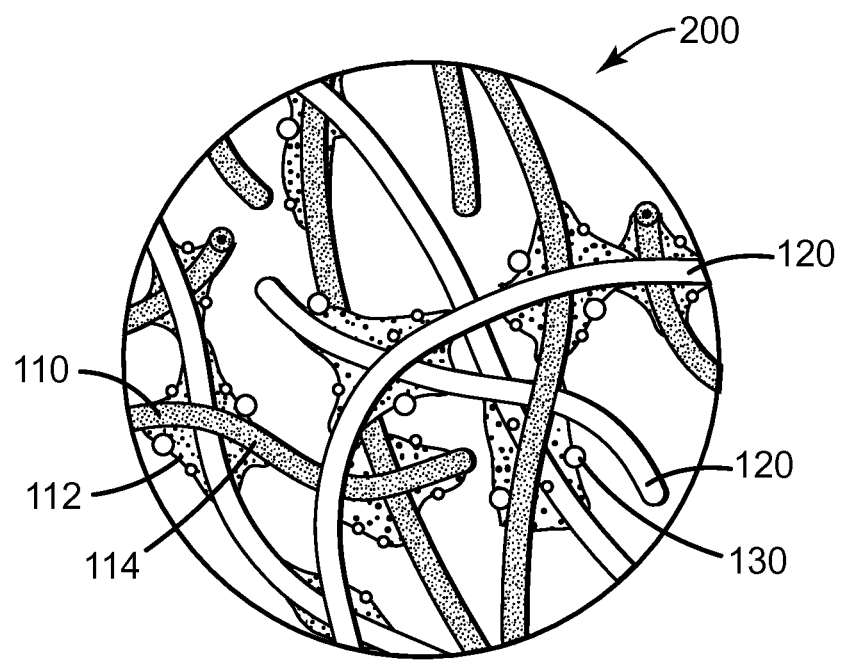
FIG. 2A is an exploded view of a portion of the nonwoven fibrous web of FIG. 1, illustrating one exemplary embodiment of the present disclosure.
Figure 2B:
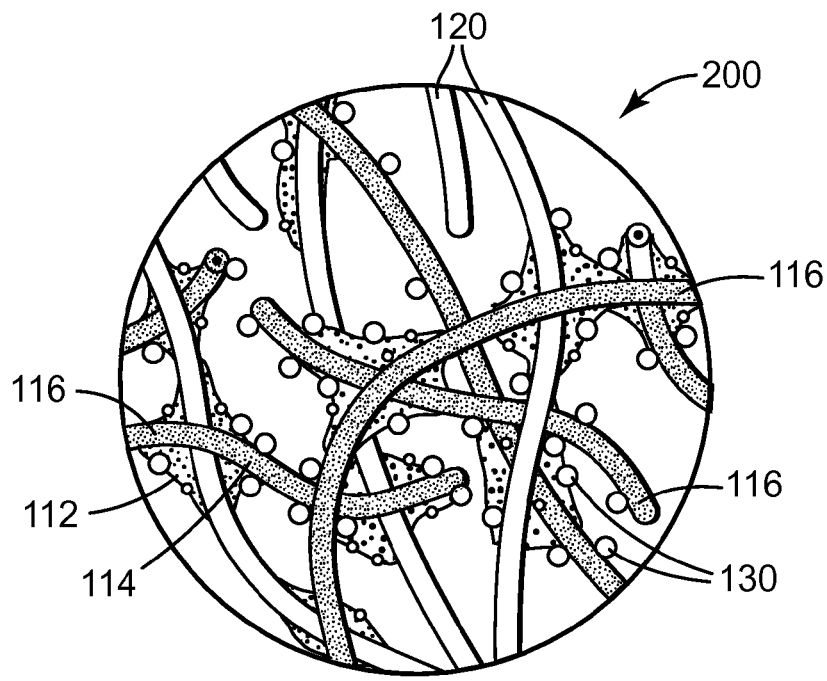
FIG. 2B is an exploded view of the nonwoven fibrous web of FIG. 1, illustrating another exemplary embodiment of the present disclosure.
Figure 2C:
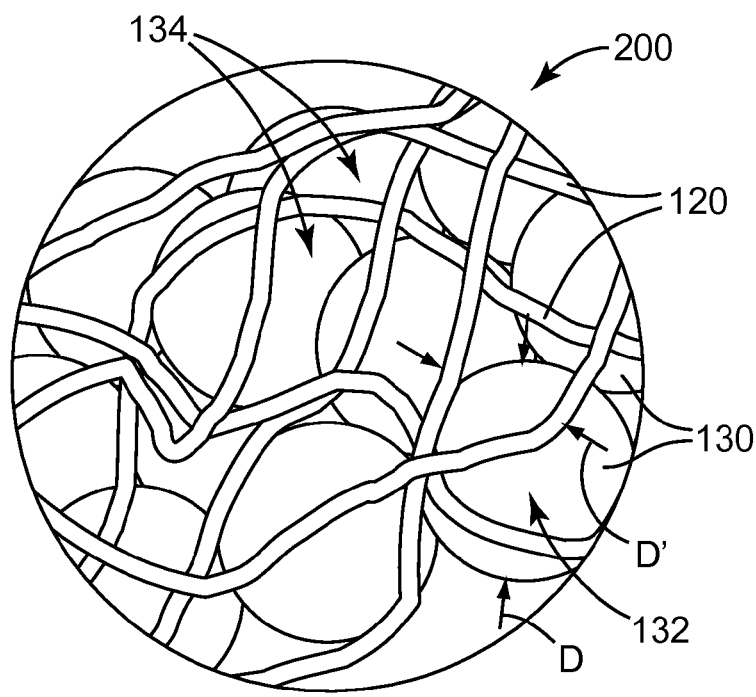
FIG. 2C is an exploded view of the nonwoven fibrous web of FIG. 1, illustrating an additional exemplary embodiment of the present disclosure.

FIG. 1 is a perspective view of one exemplary embodiment of a nonwoven fibrous web 100 comprising a plurality of discrete fibers 200 according to the present disclosure. FIGS. 2A-2C illustrate exploded views of region 2 of three different embodiments of the nonwoven fibrous web 100 of FIG. 1. Thus, in one exemplary embodiment illustrated by the exploded view of region 2 shown in FIG. 2A, the nonwoven fibrous web 100 comprises a plurality of randomly oriented discrete fibers 200 and a plurality of chemically active particulates 130, the randomly oriented discrete fibers comprising multi-component fibers 110 that include at least a first region 112 having a first melting temperature and a second region 114 having a second melting temperature, wherein the first melting temperature is less than the second melting temperature. The multi-component fibers 110 comprise greater than 0% and less than 10% by weight (% wt.) of the total weight of the nonwoven fibrous web. In some exemplary embodiments, the multi-component fibers 110 comprise greater than 0% and less than 10% wt. of the total weight of discrete fibers.

Use of the multi-component fibers 110 allows for securing the fibers together along with the chemically active particulates without the need of an additional resin coating. At least a portion of the chemically active particulates 130 are bonded to the at least first region 112 of at least a portion of the multi-component fibers 110, and at least a portion of the discrete fibers 200 are bonded together at a plurality of intersection points with the first region 112 of the multi-component fibers 110. Optionally, the nonwoven article includes discrete fibers 200 that are filling fibers 120, that is, fibers that are not multi-component fibers, and which are preferably monocomponent fibers and/or natural fibers. In some presently preferred embodiments, at least some of the filling fibers 120 may be bonded to at least a portion of the discrete fibers 200 at a plurality of intersection points with the first region 112 of the multi-component fibers 110.

In another exemplary embodiment illustrated by the exploded view of region 2 shown in FIG. 2B, the nonwoven fibrous web 100 comprises a plurality of randomly oriented discrete fibers 200 and a plurality of chemically active particulates 130, the randomly oriented discrete fibers 200 comprising a first population of monocomponent discrete thermoplastic fibers 116 having a first melting temperature, and a second population of monocomponent discrete fibers 120 having a second melting temperature greater than the first melting temperature. At least a portion of the chemically active particulates 130 is bonded to at least a portion of the first population of monocomponent discrete fibers 116, and at least a portion of the first population of monocomponent discrete fibers 116 is bonded to at least a portion of the second population of monocomponent discrete fibers 120.

In some exemplary embodiments, the first population of monocomponent discrete fibers 116 comprises greater than 0% and less than 10% wt. of the total weight of the nonwoven fibrous web. In certain exemplary embodiments, the first population of monocomponent discrete fibers 116 comprises greater than 0% and less than 10% wt. of the plurality of randomly oriented discrete fibers.

In certain exemplary embodiments, the first population of monocomponent discrete fibers 116 comprises a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof.

In any of the foregoing embodiments, the first melting temperature may be selected to be at least 50° C., more preferably at least 75° C., even more preferably at least 100° C., even more preferably at least 125° C., or even at least 150° C. In any of the foregoing embodiments, the second melting temperature may be selected to be at least 10° C., 20° C., 30° C., 40° C., or even 50° C. greater than the first melting temperature. In any of the foregoing embodiments, it is presently preferred that the first melting temperature be selected to be at least 100° C., and the second melting temperature may be selected to be at least 30° C. greater than the first melting temperature.

In yet another exemplary embodiment illustrated by the exploded view of region 2 shown in FIG. 2C, the nonwoven fibrous web 100 comprises a plurality of randomly oriented discrete fibers 200, which are shown as filling fibers 120, entangled to form a cohesive fibrous web comprising a plurality of interstitial voids 132, and a plurality of chemically active particulates 130 distributed within the interstitial voids 132 of the nonwoven fibrous web. Each interstitial void 132 defines a void volume 132 having at least one opening 134 defined by at least two overlapping filling fibers 120, and the at least one opening has a median dimension D'.

The chemically active particulates 130 exhibit a volume less than the void volume 132, and a median particulate size D greater than the median dimension D' of the at least one opening 134, and are secured to the nonwoven fibrous web at least by entrapping or enmeshing the chemically active particulates 130 within the void volume 132.

In some exemplary embodiments, the chemically active particulates 130 are preferably not substantially bonded to the filling fibers 120, and in certain exemplary embodiments, the filling fibers 120 are not substantially bonded to each other. The filling fibers 120 are any fiber other than a multi-component fiber. The filling fibers 120 are preferably mono-component fibers, which may be thermoplastic or "melty" fibers. The filling fibers 120 may, in some exemplary embodiments, comprise natural fibers, more preferably natural fibers derived from renewable sources, and/or incorporating recycled materials, as described further below.

Various components of exemplary nonwoven fibrous webs according to the present disclosure will now be described.

B. Discrete Fibrous Components

Nonwoven fibrous webs 100 of the present disclosure comprise one or more of the following fiber components.

1. Multi-component Fiber Component

In some embodiments illustrated by FIG. 2A, the nonwoven fibrous web 100 comprises discrete fibers 200 which include multi-component fibers 110 having at least a first region 112 and a second region 114, where the first region 112 has a melting temperature lower than the second region 114. A variety of different types and configurations of multi-component fibers 110 exist. Suitable multi-component fibers 110 are described in, for example, U.S. Pat. No. 7,695,660 (Berrigan et al.); U.S. Pat. No. 6,057,256 (Krueger et al.); and U.S. Pat. Nos. 5,486,410, 5,662,728, and 5,972,808 (all Groeger et al.).

In certain exemplary embodiments, the multi-component fibers 110 are bi-component fibers. One example of a suitable bi-component fiber 110 is a sheath/core fiber, where the sheath that surrounds the core forms the first region 112 and the core forms the second region 114 of the fiber. The first region 112 may be comprised of such materials as copolyester or polyethylene. The second region 114 may be comprised of such materials as polypropylene or polyester. Suitable bi-component fibers 110 are described in, for example, U.S. Pat. No. 4,552,603 (Harris et al.).

During heating, the first region 112 will melt, while the second region 114 with a higher melting temperature remains intact. During melting, the first region 112 tends to collect at junction points where fibers contact one another. Then, upon cooling, the material of the first region 112 will resolidify to secure the web together. Therefore, it is a region of the multi-component fiber 110 that secures the fibers together to form the web 100. There is generally not a need for a separate binder to form the nonwoven fibrous web 100.

By using the process disclosed below, it is possible to use the melted first region 112 of the multi-component fiber 110 to secure chemically active particulates 130 to the multi-component fiber 110, and therefore to the nonwoven fibrous web 100. In general, the more multi-component fiber used in the nonwoven fibrous web 100, the higher the possible loading of the chemically active particulates 130, as higher amounts of multi-component fibers 110 provide more available first region 112 for securing the chemically active particulates 130 to the nonwoven fibrous web 100.

Surprisingly, however, we have discovered that by maintaining the quantity of multi-component fibers 110 so that they comprise greater than 0% and less than 10% wt. of the total weight of the nonwoven fibrous web 100, more preferably greater than 0% and less than 10% wt. of the total weight of the randomly oriented discrete fibers 200 used in the nonwoven fibrous web 100, the chemically active particulates 130 may be adequately secured to the nonwoven fibrous web 100 without occluding a substantial portion of the chemically active particulate 130 surface with melted material of first region 112. Thus, in some exemplary presently-preferred embodiments, not more than 9%, 8%, 7%, 6%, 5%, 4%, or 3% wt. of the plurality of randomly oriented discrete fibers 200 in the nonwoven fibrous web 100 comprise multi-component fibers 110.

Preferred multi-component fibers 110 comprise synthetic polymers. Preferred synthetic polymers may be copolymers or even terpolymers. Preferred polymers and copolymer components may be selected from polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof.

Preferred multi-component fibers 110 may include a core and a sheath structure. One suitable class of commercially-available core and sheath multi-component polymer is available under the trade name Celbond® (available from KoSa Co. of Wichita, Kans.), for example, Celbond® 254 fiber wherein the sheath has a melting temperature of 110° C. Other commercially available multi-component polymeric fibers are within the scope of the present disclosure.

Other multi-component fibers 110 may consist of a layered structure where one layer has a first melting temperature and another layer has a second melting temperature lower than the first melting temperature. In such an arrangement, the layer with the second melting temperature will melt and resolidify to secure the web together.

Typically, the multi-component fibers 110 are at least 0.25 inch (0.635 cm) long and have a denier of at least 1. Preferably, the multi-component fibers 110 are at least 0.5 inches (1.27 cm) long and have a denier of at least 2. However, it is to be understood that the fibers can be as small as the shortest length of fiber that can be cut from a filament, or as long as can be conveniently handled.

2. Monocomponent Fiber Component

In some exemplary embodiments illustrated by FIG. 2B, the nonwoven fibrous web 100 comprises a plurality of discrete fibers 200 including a first population of monocomponent discrete thermoplastic fibers 116 having a first melting temperature, and a second population of monocomponent discrete filling fibers 120 having a second melting temperature greater than the first melting temperature. In some exemplary embodiments, the first population of monocomponent discrete thermoplastic fibers 116 comprises greater than 0% and less than 10% wt. of the total weight of the nonwoven fibrous web 100.

Surprisingly, however, we have discovered that by maintaining the quantity of monocomponent discrete thermoplastic fibers 116 so that they comprise greater than 0% and less than 10% by weight of the total weight of discrete fibers 200 used in the nonwoven fibrous web 100, the chemically active particulates 130 may be adequately secured to the nonwoven fibrous web 100 without occluding a substantial portion of the chemically active particulate 130 surface with melted material of first region 112. Thus, in some exemplary presently-preferred embodiments, not more than 9%, 8%, 7%, 6%, 5%, 4% or 3% wt. of the plurality of randomly oriented discrete fibers 200 in the nonwoven fibrous web 100 comprise monocomponent discrete thermoplastic fibers 116.

In certain exemplary embodiments, the monocomponent discrete thermoplastic fibers 116 or monocomponent discrete filling fibers 120 comprise a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof. In certain exemplary embodiments, monocomponent discrete filler fibers 120 that are non-thermoplastic or which do not exhibit a melting or softening point, may be blended together.

3. Filling Fiber Component

In further exemplary embodiments, the nonwoven fibrous web 100 may additionally or alternatively comprise discrete fibers 200 that are filling fibers 120, that is, fibers that are not multi-component fibers.

Non-limiting examples of suitable filling fibers 120 include single component synthetic fibers, semi-synthetic fibers, polymeric fibers, metal fibers, carbon fibers, ceramic fibers, and natural fibers. Synthetic and/or semi-synthetic polymeric fibers include those made of polyester (e.g., polyethylene terephthalate), nylon (e.g., hexamethylene adipamide, polycaprolactam), polypropylene, acrylic (formed from a polymer of acrylonitrile), rayon, cellulose acetate, polyvinylidene chloride-vinyl chloride copolymers, vinyl chloride-acrylonitrile copolymers, and the like.

Non-limiting examples of suitable metal fibers include fibers made from any metal or metal alloy, for example, iron, titanium, tungsten, platinum, copper, nickel, cobalt, and the like.

Non-limiting examples of suitable carbon fibers include graphite fibers, activated carbon fibers, poly(acrylonitrile)-derived carbon fibers, and the like.

Non-limiting examples of suitable ceramic fibers include any metal oxide, metal carbide, or metal nitride, including but not limited to silicon oxide, aluminum oxide, zirconium oxide, silicon carbide, tungsten carbide, silicon nitride, and the like.

Non-limiting examples of suitable natural fibers include those of cotton, wool, jute, agave, sisal, coconut, soybean, hemp, and the like. The fiber component used may be virgin fibers or recycled waste fibers, for example, recycled fibers reclaimed from garment cuttings, carpet manufacturing, fiber manufacturing, textile processing, or the like.

The size and amount of filling fibers 120, if included, used to form the nonwoven fibrous web 100 will depend on the desired properties (i.e., loftiness, openness, softness, drapability) of the nonwoven fibrous web 100 and the desired loading of the chemically active particulate. Generally, the larger the fiber diameter, the larger the fiber length, and the presence of a crimp in the fibers will result in a more open and lofty nonwoven article. Generally, small and shorter fibers will result in a more compact nonwoven article.

Flexible, drapable and compact nonwoven fibrous webs may be preferred for certain applications, for examples as furnace filters or gas filtration respirators. Such nonwoven fibrous webs typically have a density greater than 75 kg/m$^3$ and typically greater than 100 kg/m$^3$ or even 120 100 kg/m$^3$. However, open, lofty nonwoven fibrous webs suitable for use in certain fluid filtration applications generally have a maximum density of 60 kg/m$^3$. Certain nonwoven fibrous webs according to the present disclosure may have Solidity less than 20%, more preferably less than 15%, even more preferable less than 10%.

C. Chemically Active Particulate Component

As noted above, exemplary nonwoven fibrous webs 100 according to the present disclosure include a plurality of chemically active particulates. The chemically active particulates 130 can be any discrete particulate, which is a solid at room temperature, and which is capable of undergoing a chemical interaction with an external fluid phase. Exemplary chemical interactions include adsorption, absorption, chemical reaction, catalysis of a chemical reaction, dissolution, and the like.

Additionally, in any of the foregoing exemplary embodiments, the chemically active particulates may advantageously be selected from sorbent particulates (e.g. adsorbent particulates, absorbent particulates, and the like), dessicant particulates (e.g. particulates comprising a hygroscopic substance such as, for example, calcium chloride, calcium sulfate, and the like, that induces or sustains a state of dryness in its local vicinity), biocide particulates, microcapsules, and combinations thereof. In any of the foregoing embodiments, the chemically active particulates may be selected from activated carbon particulates, activated alumina particulates, silica gel particulates anion exchange resin particulates, cation exchange resin particulates, molecular sieve particulates, diatomaceous earth particulates, anti-microbial compound particulates, metal particulates, and combinations thereof.

In one exemplary embodiment of a nonwoven fibrous web 100 particularly useful as a fluid filtration article, the chemically active particulates 130 are sorbent particulates. A variety of sorbent particulates can be employed. Sorbent particulates include mineral particulates, synthetic particulates, natural sorbent particulates or a combination thereof. Desirably the sorbent particulates will be capable of absorbing or adsorbing gases, aerosols, or liquids expected to be present under the intended use conditions.

The sorbent particulates can be in any usable form including beads, flakes, granules or agglomerates. Preferred sorbent particulates include activated carbon; silica gel; activated alumina and other metal oxides; metal particulates (e.g., silver particulates) that can remove a component from a fluid by adsorption or chemical reaction; particulate catalytic agents such as hopcalite (which can catalyze the oxidation of carbon monoxide); clay and other minerals treated with acidic solutions such as acetic acid or alkaline solutions such as aqueous sodium hydroxide; ion exchange resins; molecular sieves and other zeolites; biocides; fungicides and virucides. Activated carbon and activated alumina are presently particularly preferred sorbent particulates. Mixtures of sorbent particulates can also be employed, e.g., to absorb mixtures of gases, although in practice to deal with mixtures of gases it may be better to fabricate a multilayer sheet article employing separate sorbent particulates in the individual layers.

In one exemplary embodiment of a nonwoven fibrous web 100 particularly useful as a gas filtration article (e.g. 328 in FIG. 5), the chemically active sorbent particulates 130 are selected to be gas adsorbent or absorbent particulates. For example, gas adsorbent particulates may include activated carbon, charcoal, zeolites, molecular sieves, an acid gas adsorbent, an arsenic reduction material, an iodinated resin, and the like. For example, absorbent particulates may also include naturally porous particulate materials such as diatomaceous earth, clays, or synthetic particulate foams such as melamine, rubber, urethane, polyester, polyethylene, silicones, and cellulose. The absorbent particulates may also include superabsorbent particulates such as sodium polyacrylates, carboxymethyl cellulose, or granular polyvinyl alcohol.

In certain presently preferred embodiments of a nonwoven fibrous web particularly useful as a liquid filtration article, the sorbent particulates comprise liquid an activated carbon, diatomaceous earth, an ion exchange resin (e.g. an anion exchange resin, a cation exchange resin, or combinations thereof), a molecular sieve, a metal ion exchange sorbent, an activated alumina, an antimicrobial compound, or combinations thereof. Certain presently preferred embodiments provide that the web has a sorbent particulate density in the range of about 0.20 to about 0.5 g/cc.

Various sizes and amounts of sorbent chemically active particulates 130 may be used to create a nonwoven fibrous web 100. In one exemplary embodiment, the sorbent particulates have a median size greater than 1 mm in diameter. In another exemplary embodiment, the sorbent particulates have a median size less than 1 cm in diameter. In one embodiment, a combination of particulate sizes can be used. In one exemplary embodiment, the sorbent particulates include a mixture of large particulates and small particulates.

The desired sorbent particulate size can vary a great deal and usually will be chosen based in part on the intended service conditions. As a general guide, sorbent particulates particularly useful for fluid filtration applications may vary in size from about 0.001 to about 3000 µm median diameter. Preferably the sorbent particulates are from about 0.01 to about 1500 µm median diameter, more preferably from about 0.02 to about 750 µm median diameter, and most preferably from about 0.05 to about 300 µm median diameter.

In certain exemplary embodiments, the sorbent particulates may comprise nanoparticulates having a population median diameter less than 1 µm. Porous nanoparticulates may have the advantage of providing high surface area for sorption of contaminants from a fluid medium (e.g., absorption and/or adsorption). In such exemplary embodiments using ultrafine or nanoparticulates, it is preferred that the particulates are adhesively bonded to the fibers using an adhesive, for example a hot melt adhesive, and/or the application of heat to one or both of thermoplastic particulates or thermoplastic fibers (i.e., thermal bonding).

Mixtures (e.g., bimodal mixtures) of sorbent particulates having different size ranges can also be employed, although in practice it may be better to fabricate a multilayer sheet article employing larger sorbent particulates in an upstream layer and smaller sorbent particulates in a downstream layer. At least 80 weight percent sorbent particulates, more preferably at least 84 weight percent and most preferably at least 90 weight percent sorbent particulates are enmeshed in the web. Expressed in terms of the web basis weight, the sorbent particulate loading level may for example be at least about 500 gsm for relatively fine (e.g. sub-micrometer-sized) sorbent particulates, and at least about 2,000 gsm for relatively coarse (e.g., micro-sized) sorbent particulates.

In some exemplary embodiments, the chemically active particulates 130 are metal particulates. The metal particulates may be used to create a polishing nonwoven fibrous web 100. The metal particulates may be in the form of short fiber or ribbon-like sections or may be in the form of grain-like particulates. The metal particulates can include any type of metal such as but not limited to silver (which has antibacterial/antimicrobial properties), copper (which has properties of an algaecide), or blends of one or more of chemically active metals.

In other exemplary embodiments, the chemically active particulates 130 are solid biocides or antimicrobial agents. Examples of solid biocide and antimicrobial agents include halogen containing compounds such as sodium dichloroisocyanurate dihydrate, benzylkoniumchloride, halogenated dialkylhydantoins, and triclosan.

In further exemplary embodiments, the chemically active particulates 130 are microcapsules. Microcapsules are described in U.S. Pat. No. 3,516,941 (Matson), and include examples of the microcapsules that can be used as the chemically active particulates 130. The microcapsules may be loaded with solid or liquid biocides or antimicrobial agents. One of the main qualities of a microcapsule is that by means of mechanical stress the particulates can be broken in order to release the material contained within them. Therefore, during use of the nonwoven fibrous web 100, the microcapsules will be broken due to the pressure exerted on the nonwoven fibrous web 100, which will release the material contained within the microcapsule.

In certain such exemplary embodiments, it may be advantageous to use at least one particulate that has a surface that can be made adhesive or "sticky" so as to bond together the particulates to form a mesh or support nonwoven fibrous web for the fiber component. In this regard, useful particulates may comprise a polymer, for example, a thermoplastic polymer, which may be in the form of discontinuous fibers. Suitable polymers include polyolefins, particularly thermoplastic elastomers (TPE's) (e.g., VISTAMAXX™, available from Exxon-Mobil Chemical Company, Houston, Tex.). In further exemplary embodiments, particulates comprising a TPE, particularly as a surface layer or surface coating, may be preferred, as TPE's are generally somewhat tacky, which may assist bonding together of the particulates to form a three-dimensional network before addition of the fibers to form the nonwoven fibrous web. In certain exemplary embodiments, particulates comprising a VISTAMAXX™ TPE may offer improved resistance to harsh chemical environments, particularly at low pH (e.g., pH no greater than about 3) and high pH (e.g., pH of at least about 9) and in organic solvents.

Any suitable size or shape of particulate material may be selected. Suitable particulates may have a variety of physical forms (e.g., solid particulates, porous particulates, hollow bubbles, agglomerates, discontinuous fibers, staple fibers, flakes, and the like); shapes (e.g., spherical, elliptical, polygonal, needle-like, and the like); shape uniformities (e.g., monodisperse, substantially uniform, non-uniform or irregular, and the like); composition (e.g. inorganic particulates, organic particulates, or combination thereof); and size (e.g., sub-micrometer-sized, micro-sized, and the like).

With particular reference to particulate size, in some exemplary embodiments, it may be desirable to control the size of a population of the particulates. In certain exemplary embodiments, particulates are physically entrained or trapped in the fiber nonwoven fibrous web. In such embodiments, the population of particulates is preferably selected to have a median diameter of at least 50 µm, more preferably at least 75 µm, still more preferably at least 100 µm.

In other exemplary embodiments, it is preferred to use finer particulates that are adhesively bonded to the fibers using an adhesive, for example a hot melt adhesive, and/or the application of heat to one or both of thermoplastic particulates or thermoplastic fibers (i.e., thermal bonding). In such embodiments, it is generally preferred that the particulates have a median diameter of at least 25 µm, more preferably at least 30 µm, most preferably at least 40 µm. In some exemplary embodiments, the chemically active particulates have a median size less than 1 cm in diameter. In other embodiments, the chemically active particulates have a median size of less than 1 mm, more preferably less than 25 micrometers, even more preferably less than 10 micrometers.

However, in other exemplary embodiments in which both an adhesive and thermal bonding are used to adhere the particulates to the fibers, the particulates may comprise a population of sub-micrometer-sized particulates having a population median diameter of less than one micrometer (μm), more preferably less than about 0.9 μm, even more preferably less than about 0.5 μm, most preferably less than about 0.25 μm. Such sub-micrometer-sized particulates may be particularly useful in applications where high surface area and/or high absorbency and/or adsorbent capacity is desired. In further exemplary embodiments, the population of sub-micrometer-sized particulates has a population median diameter of at least 0.001 μm, more preferably at least about 0.01 μm, most preferably at least about 0.1 μm, most preferably at least about 0.2 μm.

In further exemplary embodiments, the particulates comprise a population of micro-sized particulates having a population median diameter of at most about 2,000 μm, more preferably at most about 1,000 μm, most preferably at most about 500 μm. In other exemplary embodiments, the particulates comprise a population of micro-sized particulates having a population median diameter of at most about 10 μm, more preferably at most about 5 μm, even more preferably at most about 2 μm (e.g., ultrafine microfibers).

Multiple types of particulates may also be used within a single finished web. Using multiple types of particulates, it may be possible to generate continuous particulate webs even if one of the particulate types does not bond with other particulates of the same type. An example of this type of system would be one where two types are particulates are used, one that bonds the particulates together (e.g., a discontinuous polymeric fiber particulate) and another that acts as an active particulate for the desired purpose of the web (e.g., a sorbent particulate such as activated carbon). Such exemplary embodiments may be particularly useful for fluid filtration applications.

Depending, for example, on the density of the chemically active particulate, size of the chemically active particulate, and/or desired attributes of the final nonwoven fibrous web article, a variety of different loadings of the chemically active particulates may be used relative to the total weight of the fibrous web. In one embodiment, the chemically active particulates comprise less than 90% wt. of the total nonwoven article weight. In one embodiment, the chemically active particulates comprise at least 10% wt. of the total nonwoven article weight.

In any of the foregoing embodiments, the chemically active particulates may be advantageously distributed throughout the entire thickness of the nonwoven fibrous web. However, in some of the foregoing embodiments, the chemically active particulates are preferentially distributed substantially on a major surface of the nonwoven fibrous web.

Furthermore, it is to be understood that any combination of one or more of the above described chemically active particulates 130 may be used to form nonwoven fibrous webs 100 according to the present disclosure.

D. Optional Binder Component

In any of the foregoing exemplary embodiments, the nonwoven fibrous web is preferably substantially free of any additional binder. However, in some of the foregoing embodiments, the nonwoven fibrous web further comprises a binder coating covering at least a portion of the plurality of randomly oriented discrete fibers. In some exemplary embodiments, the binder may be a liquid or a solid powder. In certain presently preferred exemplary embodiments, the binder does not substantially occlude the surface of the chemically active particulates.

Although it is the first region 112 of the multi-component fiber 110 that secures the fibers 110, 120 and the chemically active particulate 130 together, an optional binder material or coating may be included during or following the formation of the nonwoven fibrous web 100. This optional binder coating may provide further strength to the nonwoven article, may further secure the chemically active particulates to the fibers, and/or may provide additional stiffness for an abrasive or scouring article.

The optional binder coating may be applied by known processing means such as roll coating, spray coating, and immersion coating and combinations of these coating techniques. The binder coating may include additional chemically active particulate 130 within the binder or additional chemically active particulates 130 may be incorporated and secured to the binder.

The optional binder may be a resin. Suitable resins include phenolic resins, polyurethane resins, polyureas, styrene-butadiene rubbers, nitrile rubbers, epoxies, acrylics, and polyisoprene. The binder may be water soluble. Examples of water soluble binders include surfactants, polyethylene glycol, polyvinylpyrrolidones, polylactic acid (PLA), polyvinylpyrrolidone/vinyl acetate copolymers, polyvinyl alcohols, carboxymethyl celluloses, hydroxypropyl cellulose starches, polyethylene oxides, polyacrylamides, polyacrylic acids, cellulose ether polymers, polyethyl oxazolines, esters of polyethylene oxide, esters of polyethylene oxide and polypropylene oxide copolymers, urethanes of polyethylene oxide, and urethanes of polyethylene oxide and polypropylene oxide copolymers.

E. Optional Additional Layers

Exemplary nonwoven fibrous webs of the present disclosure may optionally comprise at least one additional layer of sub-micrometer fibers, fine fibers, microfibers or coarse fiber components, such as coarse microfibers. The at least one layer of fibers may be an underlayer, support layer or collector for the nonwoven fibrous web 100, or may be an overlayer or cover layer. The at least one fiber layer may be co-formed with the nonwoven fibrous web 100, or may be pre-formed as a web roll before forming the nonwoven fibrous web 100, and unrolled to provide a collector or cover layer for the nonwoven fibrous web 100, or may be post-formed after forming the nonwoven fibrous web 100, and applied adjoining the nonwoven fibrous web 100.

1. Optional Support Layer (Collector)

The nonwoven fibrous webs of the present disclosure may further comprise an optional support layer. In certain presently preferred embodiments, the optional support layer is porous. When present, the optional support layer may provide most of the strength of the composite nonwoven fibrous article. In some embodiments, the above-described sub-micrometer fiber component tends to have very low strength, and can be damaged during normal handling. Attachment of the sub-micrometer fiber component to a support layer lends strength to the sub-micrometer fiber component, while retaining high porosity, and hence the desired absorbent properties of the sub-micrometer fiber component. A multi-layer nonwoven fibrous web structure may also provide sufficient strength for further processing, which may include, but is not limited to, winding the web into roll form, removing the web from a roll, molding, pleating, folding, stapling, weaving, and the like.

A variety of support layers may be used in the present disclosure. Suitable support layers include, but are not limited to, a nonwoven fabric, a woven fabric, a knitted fabric, a foam layer, a film, a paper layer, an adhesive-backed layer, a foil, a mesh, an elastic fabric (i.e., any of the above-described woven, knitted or nonwoven fabrics having elastic properties), an apertured web, an adhesive-backed layer, or any combination thereof. In one exemplary embodiment, the porous support layer comprises a polymeric nonwoven fabric. Suitable nonwoven polymeric fabrics include, but are not limited to, a spunbonded fabric, a meltblown fabric, a carded web of staple length fibers (i.e., fibers having a fiber length of less than about 100 mm), a needle-punched fabric, a split film web, a wet-laid hydro-entangled web, an air-laid staple fiber web, or a combination thereof. In certain exemplary embodiments, the support layer comprises a web of bonded staple fibers. As described further below, bonding may be effected using, for example, thermal bonding, adhesive bonding, powdered binder bonding, hydroentangling, needlepunching, calendering, or a combination thereof.

The support layer may have a basis weight and thickness depending upon the particular end use of the composite nonwoven fibrous article. In some embodiments of the present disclosure, it is desirable for the overall basis weight and/or thickness of the composite nonwoven fibrous article to be kept at a minimum level. In other embodiments, an overall minimum basis weight and/or thickness may be required for a given application. Typically, the support layer has a basis weight of less than about 150 gsm. In some embodiments, the support layer has a basis weight of from about 5.0 gsm to about 100 gsm. In other embodiments, the support layer has a basis weight of from about 10 gsm to about 75 gsm.

As with the basis weight, the support layer may have a thickness, which varies depending upon the particular end use of the composite nonwoven fibrous article. Typically, the support layer has a thickness of less than about 150 millimeters (mm), more preferably less than 100 mm, most preferably less than 50 mm. In certain embodiments, the support layer has a thickness of at least about 0.1 mm, more preferably at least 0.5 mm, most preferably at least 1.0 mm. In some embodiments, the support layer has a thickness of from about 1.0 mm to about 35 mm. In other embodiments, the support layer has a thickness of from about 2.0 mm to about 25 mm.

In certain exemplary embodiments, the support layer may comprise a microfiber component, for example, a population of microfibers, as described further below.

2. Optional Cover Layer

In some exemplary embodiments, nonwoven fibrous webs 100 of the present disclosure may further comprise an optional cover layer adjoining the nonwoven fibrous web 100. In certain exemplary embodiments, the optional cover layer is porous. In some exemplary embodiments, the optional cover layer comprises sub-micrometer fibers. In certain presently preferred embodiments, the nonwoven fibrous web comprises both a collector and a cover layer.

a. Microfibers

In some exemplary embodiments, a preferred microfiber or coarse fiber component comprises a population of microfibers having a population median fiber diameter of at least 1 µm. In other exemplary embodiments, a preferred coarse fiber component comprises a population of microfibers (more preferably polymeric microfibers) having a population median fiber diameter of at least 10 µm. In certain other exemplary embodiments, the microfiber component comprises a fiber population having a population median fiber diameter ranging from about 2 µm to about 100 µm. In further exemplary embodiments, the microfiber component comprises a fiber population having a median fiber diameter ranging from about 5 µm to about 50 µm.

In the present disclosure, the "median fiber diameter" of fibers in a given microfiber component is determined by producing one or more images of the fiber structure, such as by using a scanning electron microscope; measuring the fiber diameter of clearly visible fibers in the one or more images resulting in a total number of fiber diameters, x; and calculating the median fiber diameter of the x fiber diameters. Typically, x is greater than about 50, and desirably ranges from about 50 to about 200. However, in some cases, x may be selected to be as low as 30 or even 20. These lower values of x may be particularly useful for large diameter fibers, or for highly entangled fibers.

In some exemplary embodiments, the microfiber component may comprise one or more polymeric materials. Generally, any fiber-forming polymeric material may be used in preparing the microfiber, though usually and preferably the fiber-forming material is semi-crystalline. The polymers commonly used in fiber formation, such as polyethylene, polypropylene, polyethylene terephthalate, nylon, and urethanes, are especially useful. Webs have also been prepared from amorphous polymers such as polystyrene. The specific polymers listed here are examples only, and a wide variety of other polymeric or fiber-forming materials are useful.

Suitable polymeric materials include, but are not limited to, polyolefins such as polybutylene, polypropylene and polyethylene; polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; fluid crystalline polymers; polyethylene-co-vinylacetate; polyacrylonitrile; cyclic polyolefins; polyoxymethylene; polyolefinic thermoplastic elastomers; or a combination thereof.

A variety of synthetic fiber-forming polymeric materials may be employed, including thermoplastics and especially extensible thermoplastics such as linear low density polyethylenes (e.g., those available under the trade designation DOWLEX™ from Dow Chemical Company, Midland, Mich.), thermoplastic polyolefinic elastomers (TPE's), for example, those available under the trade designations ENGAGE™ (from Dow Chemical Company, Midland, Mich.), and VISTAMAXX™ from Exxon-Mobil Chemical Company, Houston, Tex.), ethylene alpha-olefin copolymers (e.g., the ethylene butene, ethylene hexene or ethylene octene copolymers available under the trade designations EXACT™ from Exxon-Mobil Chemical Company, Houston, Tex.; and ENGAGE™ from Dow Chemical Company, Midland, Mich.), ethylene vinyl acetate polymers (e.g., those available under the trade designations ELVAX™ from E. I. DuPont de Nemours & Co., Wilmington, Del.), polybutylene elastomers (e.g., those available under the trade designations CRASTIN™ from E. I. DuPont de Nemours & Co., Wilmington, Del.; and POLYBUTENE-1™ from Basell Polyolefins, Wilmington, Del.), elastomeric styrenic block copolymers (e.g., those available under the trade designations KRATON™ from Kraton Polymers, Houston, Tex.; and SOLPRENE™ from Dynasol Elastomers, Houston, Tex.) and polyether block copolyamide elastomeric materials (e.g., those available under the trade designation PEBAX™ from Arkema, Colombes, France). Thermoplastic Polyolefinic Elastomers (TPE's) are especially preferred.

A variety of natural fiber-forming materials may also be made into nonwoven microfibers according to exemplary embodiments of the present disclosure. Preferred natural materials may include bitumen or pitch (e.g., for making carbon fibers). The fiber-forming material can be in molten form or carried in a suitable solvent. Reactive monomers can also be employed, and reacted with one another as they pass to or through the die. The nonwoven webs may contain a mixture of fibers in a single layer (made for example, using two closely spaced die cavities sharing a common die tip), a plurality of layers (made for example, using a plurality of die cavities arranged in a stack), or one or more layers of multi-component fibers (such as those described in U.S. Pat. No. 6,057,256 (Krueger et al.).

Fibers also may be formed from blends of materials, including materials into which certain additives have been blended, such as pigments or dyes. bi-component microfibers, such as core-sheath or side-by-side bi-component fibers, may be prepared ("bi-component" herein includes fibers with two or more components, each component occupying a part of the cross-sectional area of the fiber and extending over a substantial length of the fiber), as may be bi-component sub-micrometer fibers. However, exemplary embodiments of the disclosure may be particularly useful and advantageous with monocomponent fibers (in which the fibers have essentially the same composition across their cross-section, but "monocomponent" includes blends or additive-containing materials, in which a continuous phase of substantially uniform composition extends across the cross-section and over the length of the fiber). Among other benefits, the ability to use single-component fibers reduces complexity of manufacturing and places fewer limitations on use of the web.

In addition to the fiber-forming materials mentioned above, various additives may be added to the fiber melt and extruded to incorporate the additive into the fiber. Typically, the amount of additives is less than about 25 weight percent, desirably, up to about 5.0 weight percent, based on a total weight of the fiber. Suitable additives include, but are not limited to, particulates, fillers, stabilizers, plasticizers, tackifiers, flow control agents, cure rate retarders, adhesion promoters (for example, silanes and titanates), adjuvants, impact modifiers, expandable microspheres, thermally conductive particulates, electrically conductive particulates, silica, glass, clay, talc, pigments, colorants, glass beads or bubbles, antioxidants, optical brighteners, antimicrobial agents, surfactants, fire retardants, and fluorochemicals.

One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, fluid barrier or adhesive tack related properties.

i. Formation of Microfibers

A number of processes may be used to produce and deposit the population of microfibers, including, but not limited to, melt blowing, melt spinning, filament extrusion, plexifilament formation, spunbonding, wet spinning, dry spinning, or a combination thereof. Suitable processes for forming microfibers are described in U.S. Pat. No. 6,315,806 (Torobin), U.S. Pat. No. 6,114,017 (Fabbricante et al.), U.S. Pat. No. 6,382,526 B1 (Reneker et al.), and U.S. Pat. No. 6,861,025 B2 (Erickson et al.). Alternatively, a population of microfibers may be formed or converted to staple fibers and combined with a population of sub-micrometer fibers using, for example, using a process as described in U.S. Pat. No. 4,118,531 (Hauser). In certain exemplary embodiments, the population of microfibers comprises a web of bonded microfibers, wherein bonding is achieved using thermal bonding, adhesive bonding, powdered binder, hydroentangling, needlepunching, calendering, or a combination thereof, as described below.

b. Spunbonded and Carded Fibers

In one exemplary embodiment of the present disclosure, the support layer comprises a spunbonded fabric comprising polypropylene fibers. In a further exemplary embodiment of the present disclosure, the support layer comprises a carded web of staple length fibers, wherein the staple length fibers comprise: (i) low-melting temperature or binder fibers; and (ii) high-melting temperature or structural fibers. Typically, the binder fibers have a melting temperature of at least 10° C. less than a melting temperature of the structural fibers, although the difference between the melting temperature of the binder fibers and structural fibers may be greater than 10° C. Suitable binder fibers include, but are not limited to, any of the above-mentioned polymeric fibers. Suitable structural fibers include, but are not limited to, any of the above-mentioned polymeric fibers, as well as inorganic fibers such as ceramic fibers, glass fibers, and metal fibers; and organic fibers such as cellulosic fibers.

In certain presently preferred embodiments, the support layer comprises a carded web of staple length fibers, wherein the staple length fibers comprise a blend of PET monocomponent, and PET/coPET bi-component staple fibers. In one exemplary presently preferred embodiment, the support layer comprises a carded web of staple length fibers, wherein the staple length fibers comprise: (i) about 20 weight percent bi-component binder fibers (e.g. INVISTA™ T254 fibers, available from Invista, Inc., Wichita, Kans.), 12d×1.5"; and (ii) about 80 weight percent structural fibers (e.g. INVISTA™ T293 PET fibers), 32d×3".

As described above, the support layer may comprise one or more layers in combination with one another. In one exemplary embodiment, the support layer comprises a first layer, such as a nonwoven fabric or a film, and an adhesive layer on the first layer opposite the sub-micrometer fiber component. In this embodiment, the adhesive layer may cover a portion of or the entire outer surface of the first layer. The adhesive may comprise any known adhesive including pressure-sensitive adhesives, heat activatable adhesives, etc. When the adhesive layer comprises a pressure-sensitive adhesive, the composite nonwoven fibrous article may further comprise a release liner to provide temporary protection of the pressure-sensitive adhesive.

c. Sub-Micrometer Fibers

Exemplary nonwoven fibrous webs 100 of the present disclosure may optionally comprise a population of sub-micrometer fibers. In some presently preferred embodiments, the population of sub-micrometer fibers comprises a layer adjoining the nonwoven fibrous web 100. The at least one layer comprising a sub-micrometer fiber component may be an underlayer (e.g. a support layer or collector for the nonwoven fibrous web 100), but more preferably is used as an overlayer or cover layer. The population of sub-micrometer fibers may be co-formed with the nonwoven fibrous web 100, or may be pre-formed as a web roll (see e.g. web rolls 260 and 262 in FIG. 3) before forming the nonwoven fibrous web 100 and unrolled to provide a collector (see e.g. web roll 260 and collector 232 in FIG. 3) or cover layer (see e.g. web roll 262 and cover layer 230 in FIG. 3) for the nonwoven fibrous web 100, or alternatively or additionally may be post-formed after forming the nonwoven fibrous web 100, and applied adjoining, preferably overlaying, the nonwoven fibrous web 100 (see e.g. post-forming applicator 216 applying fibers 218 to nonwoven fibrous web 100 in FIG. 3).

In certain exemplary embodiments, the fine fiber component comprises a population of fine microfibers having a population median diameter less than 10 µm. In other exemplary embodiments, the fine fiber component comprises a population of ultrafine microfibers having a population median diameter less than about 2 µm. In certain presently preferred embodiments, the fine fiber component comprises a population of sub-micrometer fibers having a population median diameter less than 1 µm.

In some exemplary embodiments, the sub-micrometer fiber component comprises a fiber population having a population median fiber diameter ranging from about 0.2 µm to about 0.9 µm. In other exemplary embodiments, the sub-micrometer fiber component comprises a fiber population having a population median fiber diameter ranging from about 0.5 µm to about 0.7 µm.

In the present disclosure, the "median fiber diameter" of fibers in a given sub-micrometer fiber component is determined by producing one or more images of the fiber structure, such as by using a scanning electron microscope; measuring the fiber diameter of clearly visible fibers in the one or more images resulting in a total number of fiber diameters, x; and calculating the median fiber diameter of the x fiber diameters. Typically, x is greater than about 50, and desirably ranges from about 50 to about 200. However, in some cases, x may be selected to be as low as 30 or even 20. These lower values of x may be particularly useful for highly entangled fibers.

In some exemplary embodiments, the sub-micrometer fiber component may comprise one or more polymeric materials. Suitable polymeric materials include, but are not limited to, polyolefins such as polypropylene and polyethylene; polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; fluid crystalline polymers; polyethylene-co-vinylacetate; polyacrylonitrile; cyclic polyolefins; polyoxymethylene; polyolefinic thermoplastic elastomers; or a combination thereof.

The sub-micrometer fiber component may comprise monocomponent fibers comprising any one of the above-mentioned polymers or copolymers. In this exemplary embodiment, the monocomponent fibers may contain additives as described below, but comprise a single fiber-forming material selected from the above-described polymeric materials. Further, in this exemplary embodiment, the monocomponent fibers typically comprise at least 75 weight percent of any one of the above-described polymeric materials with up to 25 weight percent of one or more additives. Desirably, the monocomponent fibers comprise at least 80 weight percent, more desirably at least 85 weight percent, at least 90 weight percent, at least 95 weight percent, and as much as 100 weight percent of any one of the above-described polymeric materials, wherein all weights are based on a total weight of the fiber.

The sub-micrometer fiber component may also comprise multi-component fibers formed from (1) two or more of the above-described polymeric materials and (2) one or more additives as described below. As used herein, the term "multi-component fiber" is used to refer to a fiber formed from two or more polymeric materials. Suitable multi-component fiber configurations include, but are not limited to, a sheath-core configuration, a side-by-side, a layered or a segmented pie/wedge configuration (for example, U.S. Pat. No. 4,729,371 describes layered bi-component meltblown fibers, also referred to as striped fibers; and PCT Pat. Pub. WO 2008/085545 describes segmented pie/wedge fibers and layered fibers in FIGS. 1a-1e), and an "islands-in-the-sea" configuration (for example, fibers produced by Kuraray Company, Ltd., Okayama, Japan).

For sub-micrometer fiber components formed from multi-component fibers, desirably the multi-component fiber comprises (1) from about 75 to about 99 weight percent of two or more of the above-described polymers and (2) from about 25 to about 1 weight percent of one or more additional fiber-forming materials based on the total weight of the fiber.

The methods of making composite nonwoven fibrous webs of the present disclosure may be used to form a sub-micrometer fiber component containing fibers formed from any of the above-mentioned polymeric materials. Typically, the sub-micrometer fiber forming method step involves melt extruding a thermoformable material at a melt extrusion temperature ranging from about 130° C. to about 350° C. A die assembly and/or coaxial nozzle assembly (see, for example, the Torobin process referenced above) comprises a population of spinnerets and/or coaxial nozzles through which molten thermoformable material is extruded. In one exemplary embodiment, the coaxial nozzle assembly comprises a population of coaxial nozzles formed into an array so as to extrude multiple streams of fibers onto a support layer or substrate. See, for example, U.S. Pat. No. 4,536,361 (FIG. 2) and U.S. Pat. No. 6,183,670 (FIGS. 1-2).

In some exemplary embodiments, a composite nonwoven fibrous web layer may be formed of sub-micrometer fibers commingled with coarser microfibers providing a support structure for the sub-micrometer nonwoven fibers. The support structure may provide the resiliency and strength to hold the fine sub-micrometer fibers in the preferred low Solidity form. The support structure could be made from a number of different components, either singly or in concert. Examples of supporting components include, for example, microfibers, discontinuous oriented fibers, natural fibers, foamed porous cellular materials, and continuous or discontinuous non oriented fibers.

In one exemplary embodiment, a microfiber stream is formed and a sub-micrometer fiber stream is separately formed and added to the microfiber stream to form the composite nonwoven fibrous web. In another exemplary embodiment, a sub-micrometer fiber stream is formed and a microfiber stream is separately formed and added to the sub-micrometer fiber stream to form the composite nonwoven fibrous web. In these exemplary embodiments, either one or both of the sub-micrometer fiber stream and the microfiber stream is oriented. In an additional embodiment, an oriented sub-micrometer fiber stream is formed and discontinuous microfibers are added to the sub-micrometer fiber stream, e.g. using a process as described in U.S. Pat. No. 4,118,531 (Hauser).

In some exemplary embodiments, the method of making a composite nonwoven fibrous web comprises combining the sub-micrometer fiber population and the microfiber population into a composite nonwoven fibrous web by mixing fiber streams, hydroentangling, wet forming, plexifilament formation, or a combination thereof. In combining the sub-micrometer fiber population with the microfiber population, multiple streams of one or both types of fibers may be used, and the streams may be combined in any order. In this manner, nonwoven composite fibrous webs may be formed exhibiting various desired concentration gradients and/or layered structures.

For example, in certain exemplary embodiments, the population of sub-micrometer fibers may be combined with a population of microfibers to form an inhomogenous mixture of fibers. In other exemplary embodiments, the population of sub-micrometer fibers may be formed as an overlayer on an underlayer comprising the nonwoven fibrous web 100. In certain other exemplary embodiments, the nonwoven fibrous web 100 may be formed as an overlayer on an underlayer (e.g. a support layer or collector) comprising the population of sub-micrometer fibers.

i. Formation of Sub-Micrometer Fibers

A number of processes may be used to produce and deposit the sub-micrometer fibers, including, but not limited to melt blowing, melt spinning, electrospinning, gas jet fibrillation, or combination thereof. Suitable processes include, but are not limited to, processes disclosed in U.S. Pat. No. 3,874,886 (Levecque et al.), U.S. Pat. No. 4,363,646 (Torobin), U.S. Pat. No. 4,536,361 (Torobin), U.S. Pat. No. 6,183,670 (Torobin), U.S. Pat. No. 5,227,107 (Dickenson et al.), U.S. Pat. No. 6,114,017 (Fabbricante et al.), U.S. Pat. No. 6,382,526 B1 (Reneker et al.), U.S. Pat. No. 6,743,273 (Chung et al.), U.S. Pat. No. 6,800,226 (Gerking), and U.S. Pat. No. 6,861,025 B2 (Erickson et al.). One particularly suitable process for forming sub-micrometer fibers is described in co-pending U.S. Pat. App. No. 61/238,761, titled "APPARATUS, SYSTEM, AND METHOD FOR FORMING NANOFIBERS AND NANOFIBER WEBS" (Moore et al.). A presently-preferred process for forming sub-micrometer fibers is an electrospinning process, for example, the processes described in U.S. Pat. No. 1,975,504 (Formhals).

F. Methods of Making Nonwoven Fibrous Webs with Chemically Active Particulates

The disclosure also provides a method of making a nonwoven fibrous web according to any of the foregoing embodiments, the method comprising providing a forming chamber having an upper end and a lower end, introducing a plurality of discrete fibers into the upper end of the forming chamber, introducing a plurality of chemically active particulates into the forming chamber, mixing the discrete fibers with the chemically active particulates within the forming chamber to form a fibrous particulate mixture, transporting the fibrous particulate mixture to the lower end of the forming chamber to form a nonwoven fibrous web, and securing the chemically active particulates to the nonwoven fibrous web.

In certain exemplary embodiments, transporting the fibrous particulate mixture to the lower end of the forming chamber to form a nonwoven fibrous web comprises dropping the discrete fibers into the forming chamber and permitting the fibers to drop through the forming chamber under the force of gravity. In other exemplary embodiments, transporting the fibrous particulate mixture to the lower end of the forming chamber to form a nonwoven fibrous web comprises dropping the discrete fibers into the forming chamber and permitting the fibers to drop through the forming chamber under the forces of gravity and a vacuum force applied to the lower end of the forming chamber.

In some exemplary embodiments wherein more than 0% and less than 10% wt. of the nonwoven fibrous web, more preferably more than 0% and less than 10% wt. of the discrete fibers, is comprised of multi-component fibers comprising at least a first region having a first melting temperature and a second region having a second melting temperature wherein the first melting temperature is less than the second melting temperature, securing the chemically active particulates to the nonwoven fibrous web comprises heating the multi-component fibers to a temperature of at least the first melting temperature and less than the second melting temperature, whereby at least a portion of the chemically active particulates are bonded to the at least first region of at least a portion of the multi-component fibers, and at least a portion of the discrete fibers are bonded together at a plurality of intersection points with the first region of the multi-component fibers.

In other exemplary embodiments wherein the plurality of discrete fibers includes a first population of monocomponent discrete thermoplastic fibers having a first melting temperature, and a second population of monocomponent discrete fibers having a second melting temperature greater than the first melting temperature, securing the chemically active particulates to the nonwoven fibrous web comprises heating the thermoplastic fibers to a temperature of at least the first melting temperature and less than the second melting temperature, whereby at least a portion of the chemically active particulates are bonded to at least a portion of the first population of monocomponent discrete fibers, and further wherein at least a portion of the first population of monocomponent discrete fibers is bonded to at least a portion of the second population of monocomponent discrete fibers.

In some exemplary embodiments comprising a first population of monocomponent discrete thermoplastic fibers having a first melting temperature and a second population of monocomponent discrete fibers having a second melting temperature greater than the first melting temperature, preferably more than 0% and less than 10% wt. of the nonwoven fibrous web, more preferably more than 0% and less than 10% wt. of the discrete fibers, is comprised of the first population of monocomponent discrete thermoplastic.

In certain exemplary embodiments, securing the chemically active particulates to the nonwoven fibrous web comprises heating the first population of monocomponent discrete thermoplastic fibers to a temperature of at least the first melting temperature and less than the second melting temperature, whereby at least a portion of the chemically active particulates are bonded to at least a portion of the first population of monocomponent discrete thermoplastic fibers, and at least a portion of the discrete fibers are bonded together at a plurality of intersection points with the first population of monocomponent discrete thermoplastic fibers.

In any of the foregoing exemplary embodiments, securing the chemically active particulates to the nonwoven fibrous web comprises at least one of thermal bonding, autogenous bonding, adhesive bonding, powdered binder binding, hydroentangling, needlepunching, calendering, or a combination thereof. In some of the foregoing embodiments, securing the chemically active particulates to the nonwoven fibrous web comprises entangling the discrete fibers, thereby forming a cohesive nonwoven fibrous web including a plurality of interstitial voids, each interstitial void defining a void volume having at least one opening having a median dimension defined by at least two overlapping fibers, wherein the chemically active particulates exhibit a volume less than the void volume and a median particulate size greater than the median dimension, further wherein the chemically active particulates are not substantially bonded to the discrete fibers and the discrete fibers are not substantially bonded to each other.

In any of the foregoing exemplary embodiments, a liquid may be introduced into the forming chamber to wet at least a portion of the discrete fibers, whereby at least a portion of the chemically active particulates adhere to the wetted discrete fibers in the forming chamber.

In any of the foregoing embodiments, the chemically active particulates may be introduced into the forming chamber at the upper end, at the lower end, between the upper end and the lower end, or a combination thereof. In any of the foregoing embodiments, the nonwoven fibrous web may be formed on a collector, wherein the collector is selected from a screen, a scrim, a mesh, a nonwoven fabric, a woven fabric, a knitted fabric, a foam layer, a porous film, a perforated film, an array of filaments, a melt-fibrillated nanofiber web, a meltblown fibrous web, a spun bond fibrous web, an air-laid fibrous web, a wet-laid fibrous web, a carded fibrous web, a hydro-entangled fibrous web, and combinations thereof.

In other examples of any of the foregoing embodiments, the method further comprises applying a fibrous cover layer overlaying the nonwoven fibrous web, wherein the fibrous cover layer is formed by air-laying, wet-laying, carding, melt blowing, melt spinning, electrospinning, plexifilament formation, gas jet fibrillation, fiber splitting, or a combination thereof. In certain exemplary embodiments, the fibrous cover layer comprises a population of sub-micrometer fibers having a median fiber diameter of less than 1 µm formed by melt blowing, melt spinning, electrospinning, plexifilament formation, gas jet fibrillation, fiber splitting, or a combination thereof.

Through some embodiments of the process described below, it is possible to obtain the chemically active particulates preferentially on one surface of the nonwoven article. For open, lofty nonwoven webs, the chemically active particulates will fall through the web and preferentially be on the bottom of the nonwoven article. For dense nonwoven webs, the chemically active particulates will remain on the surface and preferentially be on the top of the nonwoven article.

Further, as described below, it is possible to obtain a distribution of the chemically active particulates throughout the thickness of the nonwoven article. In this embodiment, the chemically active particulate therefore is available on both working surfaces of the web and throughout the thickness. In one embodiment, the fibers can be wetted to aid in the clinging the chemically active particulate to the fibers until the fiber can be melted to secure the chemically active particulates. In another embodiment, for dense nonwoven webs, a vacuum can be introduced to pull the chemically active particulates throughout the thickness of the nonwoven article.

Figure 3:
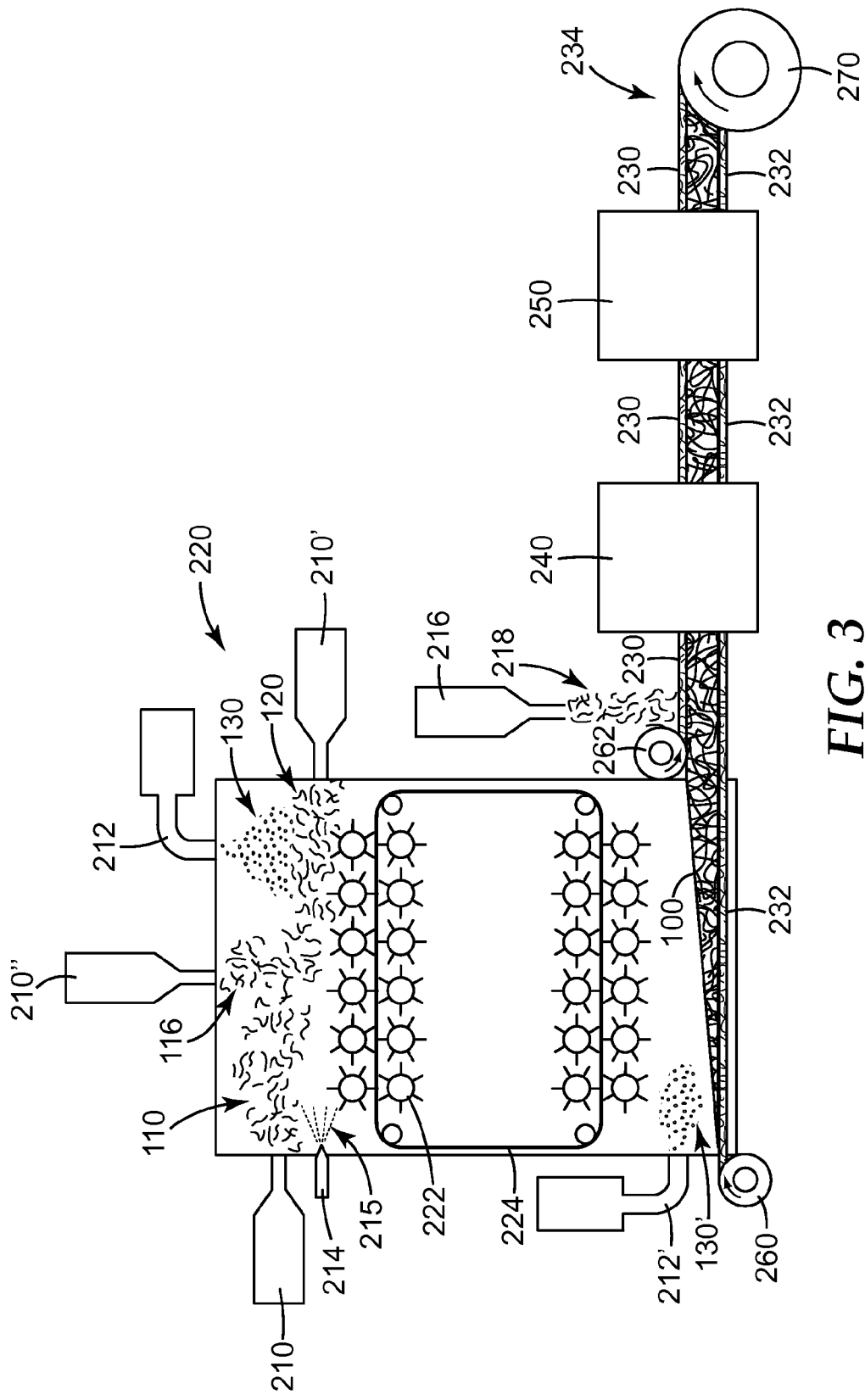
FIG. 3 is a side view showing a process of making various embodiments of nonwoven fibrous webs of the present disclosure.

FIG. 3 is a side view showing an exemplary apparatus 220 which may be configured to practice various processes for making the exemplary nonwoven fibrous webs 100 described above. One or more discrete fiber input streams (210, 210', 210") are positioned proximate the top of a forming chamber 220 wherein the discrete fibers are mixed, blended, and ultimately form a nonwoven fibrous web 100.

As shown in FIG. 3, a separate fiber stream 210 is shown introducing a plurality of multi-component fibers 110 into the forming chamber 220; a separate fiber stream 210' is shown introducing a plurality of discrete filling fibers 120 (which may be natural fibers) into the forming chamber 220; and a separate fiber stream 210" is shown introducing a first population of discrete thermoplastic fibers 116 into the forming chamber 220. However, it is to be understood that the discrete fibers need not be introduced into the forming chamber as separate streams, and at least a portion of the discrete fibers may advantageously be combined into a single fiber stream prior to entering the forming chamber 220. For example, prior to entering the forming chamber 220, an opener (not shown) may be included to open, comb, and/or blend the input discrete fibers, particularly if a blend of multi-component 110 and filling fibers 120 is included.

Furthermore, the positions at which the fiber streams (210, 210', 210") are introduced into the forming chamber 220 may be advantageously varied. For example, a fiber stream may advantageously be located at the left side, top, or right side of the forming chamber. Furthermore, a fiber stream may advantageously be positioned to introduce at the top, or even at the middle of the forming chamber 220. However, it is presently preferred that the fiber streams be introduced above endless belt screen 224, as described further below.

Also, entering the forming chamber 220 is one or more input streams (212, 212') of chemically active particulates (130, 130'). Although two streams of chemically active particulates (212, 212') are shown in FIG. 3, it is to be understood that only one stream may be used, or more than two streams may be used. It is to be understood that if multiple input streams (212, 212') are used, the chemically active particulates may be the same (not shown) or different (130, 130') in each stream (212, 212'). If multiple input streams (212, 212') are used, it is presently preferred that the chemically active particulates (130, 130') comprise distinct particulate materials.

It is further understood that the chemically active particulate input stream(s) (212, 212') may be advantageously introduced at other regions of the forming chamber 220. For example, the chemically active particulates may be introduced proximate the top of the forming chamber 220 (input stream 212 introducing chemically active particulates 130), and/or in the middle of the forming chamber (not shown), and/or at the bottom of the forming chamber 220 (input stream 212' introducing chemically active particulates 130').

Furthermore, the positions at which the particulate input streams (212, 212') are introduced into the forming chamber 220 may be advantageously varied. For example, an input stream may advantageously be located to introduce chemically active particulates (130, 130') at the left side (212'), top (212), or right side (not shown) of the forming chamber. Furthermore, an input stream may advantageously be positioned to introduce chemically active particulates (130, 130') at the top (212), middle (not shown) or bottom (212') of the forming chamber 220.

In some exemplary embodiments (e.g. wherein the chemically active particulates comprise fine particulates with median size or diameter of about 1-25 micrometers, or wherein the chemically active particulates comprise low density particulates with densities less than 1 g/ml), it is presently preferred that at least one input stream (212) for chemically active particulates (130) be introduced above endless belt screen 224, as described further below.

In other exemplary embodiments (e.g. wherein the chemically active particulates comprise coarse particulates with median size or diameter of greater than about 25 micrometers, or wherein the chemically active particulates comprise high density particulates with densities greater than 1 g/ml), it is presently preferred that at least one input stream (212') for chemically active particulates (130') be introduced below endless belt screen 224, as described further below. In certain such embodiments, it is presently preferred that at least one input stream (212') for chemically active particulates (130') be introduced at the left side of the forming chamber.

Furthermore, in certain exemplary embodiments wherein the chemically active particulates comprise extremely fine particulates with median size or diameter of less than about 5 micrometers and density greater than 1 g/ml, it is presently preferred that at least one input stream (212') for chemically active particulates be introduced at the right side of the forming chamber, preferably below endless belt screen 224, as described further below.

Additionally, in some particular exemplary embodiments, an input stream (e.g. 212) may advantageously be located to introduce chemically active particulates (e.g. 130) in a manner such that the chemically active particulates 130 are distributed substantially uniformly throughout the nonwoven fibrous web 100. Alternatively, in some particular exemplary embodiments, an input stream (e.g. 212') may advantageously be located to introduce chemically active particulates (e.g. 130') in a manner such that the chemically active particulates 130 are distributed substantially at a major surface of the nonwoven fibrous web 100, for example, proximate the lower major surface of nonwoven fibrous web 100 in FIG. 3, or proximate the upper major surface of nonwoven fibrous web 100 (not shown).

Although FIG. 3 illustrates one exemplary embodiment wherein chemically active particulates (e.g. 130') may be distributed substantially at the lower major surface of the nonwoven fibrous web 100, it is to be understood that other distributions of the chemically active particulates within the nonwoven fibrous web may be obtained, which will depend upon the location of the input stream of chemically active particulates into the forming chamber 220, and the nature (e.g. median particle size or diameter, density, etc.) of the chemically active particulates.

Thus, in one exemplary embodiment (not shown), an input stream of chemically active particulates may be advantageously located (e.g. proximate the lower right side of forming chamber 220) to introduce extremely coarse or high density chemically active particulates in a manner such that the chemically active particulates are distributed substantially at the top major surface of nonwoven fibrous web 100. Other distributions of chemically active particulates (130, 130') on or within the nonwoven fibrous web 100 are within the scope of this disclosure.

Suitable apparatus for introducing the input streams (212, 212') of chemically active particulates (130, 130') to forming chamber 220 include commercially available vibratory feeders, for example, those manufactured by K-Tron, Inc. (Pitman, N.J.). The input stream of chemically active particulates may, in some exemplary embodiments, be augmented by an air nozzle to fluidize the chemically active particulates. Suitable air nozzles are commercially available from Spraying Systems, Inc. (Wheaton, Ill.).

The forming chamber 220 is preferably a type of airlaying fiber processing equipment, such as shown and described in U.S. Pat. Nos. 7,491,354 and 6,808,664. Instead of using strong air flow to mix and inter-engaged the fibers to form a nonwoven fibrous web (such as with a "RandoWebber" web forming machine, available from Rando Machine Corporation, Macedon, N.Y.), the forming chamber 220 has spike rollers 222 to blend and mix the fibers while gravity allows the fibers to fall down through the endless belt screen 224 and form a nonwoven fibrous web 100 of inter-engaged fibers. With this construction of airlaying equipment, the fibers and the chemically active particulates are, in some embodiments, falling together to the bottom of the forming chamber 220 to form the nonwoven fibrous web 100. In one exemplary embodiment, a vacuum can be included below the area where the nonwoven fibrous web 100 forms in the forming chamber 220 (not shown).

Referring to FIGS. 2A and 3, in some exemplary embodiments, the formed nonwoven fibrous web 100 exits the forming chamber 220 and proceeds to an optional heating unit 240, such as an oven, which, if multi-component fibers 110 are included in the nonwoven fibrous web 100, is used to heat the first region 112 of the multi-component fiber 110. The melted first region 112 tends to migrate and collect at points of intersection of the fibers of the nonwoven fibrous web 100. Then, upon cooling, the melted first region 112 coalesces and solidifies to create a secured, interconnected nonwoven fibrous web 100.

The chemically active particulates 130 may, in some embodiments, be secured to the nonwoven fibrous web 100 by the melted and then coalesced first region 112 of the multi-component fiber 110, or the partially melted and then coalesced first population of thermoplastic monocomponent fibers 116. Therefore, in two steps, first forming the web and then heating the web, a nonwoven web containing chemically active particulates 130 can be created without the need for binders or further coating steps.

In one exemplary embodiment, the chemically active particulates 130 fall through the fibers of the nonwoven fibrous web 100 and are therefore preferentially on a lower surface of the nonwoven fibrous web 100. When the nonwoven fibrous web proceeds to the heating unit 240, the melted and then coalesced first region 112 of the multi-component fibers 110 located on the lower surface of the nonwoven fibrous web 100 secures the chemically active particulates 130 to the nonwoven fibrous web 100, preferably without the need for an additional binder coating.

In another exemplary embodiment, when the nonwoven fibrous web is a relatively dense web with small openings, the chemically active particulates 130 remain preferentially on a top surface 234 of the nonwoven fibrous web 100. In such an embodiment, a gradient may form of the particulates partially falling through some of the openings of the web. When the nonwoven fibrous web 100 proceeds to the heating unit 240, the melted and then coalesced first region 112 of the multi-component fibers 110 (or partially melted thermoplastic monocomponent fibers 116) located on or proximate the top surface of the nonwoven fibrous web 100 secures the chemically active particulates 130 to the nonwoven fibrous web 100, preferably without the need for an additional binder coating.

In another embodiment, a liquid 215, which is preferably water or an aqueous solution, is introduced as a mist from an atomizer 214. The liquid 215 preferably wets the discrete fibers (110, 116, 120), so that the chemically active particulates (130, 130') cling to the surface of the fibers. Therefore, the chemically active particulates (130, 130') are generally dispersed throughout the thickness of the nonwoven fibrous web 100. When the nonwoven fibrous web 100 proceeds to the heating unit 240, the liquid 215 preferably evaporates while the first region 112 of the (multi-component or thermoplastic monocomponent) discrete fiber 110 melts. The melted and then coalesced first region 112 of the multi-component (or thermoplastic monocomponent) discrete fiber secures the fibers of the nonwoven fibrous web 100 together, and additionally secures the chemically active particulates (130, 130') to the nonwoven fibrous web 100, without the need for an additional binder coating.

The mist of liquid 215 is shown wetting the fibers 110, and 116' and 120, if included, after introduction of the discrete fibers (110, 116, 120) into the forming chamber 220. However, wetting of the fibers could occur at other locations in the process, including before introduction of the discrete fibers (110, 116, 120) into the forming chamber 220. For example, liquid may be introduced at the bottom of the forming chamber 220 to wet the nonwoven fibrous web 100 while the chemically active particulates 130 are being dropped. The mist if liquid 215 could additionally or alternatively be introduced at the top of the forming chamber 220, or in the middle of the forming chamber 220 to wet the chemically active particulates (130, 130') and discrete fibers (110, 116, 120) prior to dropping.

It is understood that the chemically active particulates 130 chosen must be capable of withstanding the heat that the nonwoven fibrous web 100 is exposed to in order to melt the first region 112 of the multi-component fiber 110. Generally, the heat is provided at or to 100 to 150° C. Further, it is understood that the chemically active particulates 130 chosen must be capable of withstanding the mist of liquid solution 214, if included. Therefore, the liquid of the mist may be an aqueous solution, and in another embodiment, the liquid of the mist may be an organic solvent solution.

Figure 4A:
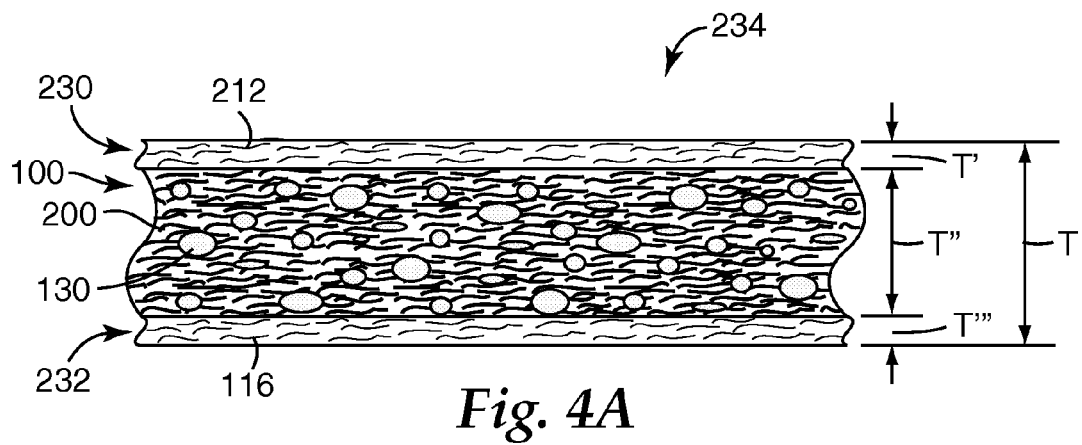
FIG. 4A is a side view showing an exemplary embodiment of a multilayer nonwoven fibrous web of the present disclosure.
Figure 4B:
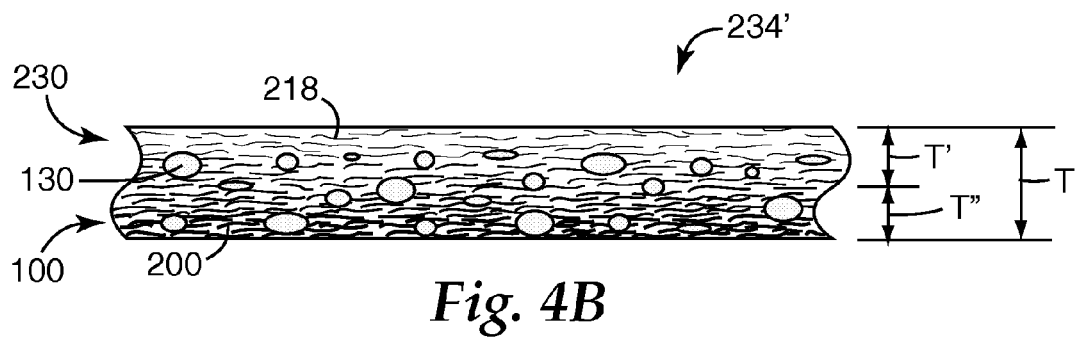
FIG. 4B is a side view showing another exemplary embodiment of a multilayer nonwoven fibrous web of the present disclosure.

As shown in FIG. 3 and FIGS. 4A-4B, exemplary nonwoven fibrous webs 100 of the present disclosure may optionally include at least one additional layer adjoining the nonwoven fibrous web 100 comprising a plurality of discrete fibers and a plurality of chemically active particulates. The at least one adjoining layer may be an underlayer (e.g. a support layer or collector 232 for the nonwoven fibrous web 100), an overlayer (e.g. cover layer 230), or a combination thereof. The at least one adjoining layer need not directly contact a major surface of the nonwoven fibrous web 100 as shown in FIG. 3 and FIGS. 4A-4B, but preferably does contact at least one major surface of the nonwoven fibrous web 100.

In some exemplary embodiments, the at least one additional layer may be pre-formed, for example, as a web roll (see e.g. web rolls 260 and 262 in FIG. 3) produced before forming the nonwoven fibrous web 100. In some exemplary embodiments, web roll 260 may be unrolled and passed under the forming chamber 220 to provide a collector 232 for the nonwoven fibrous web 100. In certain exemplary embodiments, the web roll 262 may be positioned to apply a cover layer 230 after the nonwoven fibrous web 100 exits the forming chamber 220.

In other exemplary embodiments, the at least one adjoining layer may be co-formed with the nonwoven fibrous web 100 using, for example, post-forming applicator 216 which is shown applying a plurality of fibers 218 (which, in some presently preferred embodiments, comprises a population of fibers having a median diameter less than one micrometer) adjoining (preferably contacting) a major surface of nonwoven fibrous web 100, thereby forming a multilayer composite nonwoven fibrous web 234 which, in some embodiments, is useful in manufacturing a filtration article.

As noted above, exemplary nonwoven fibrous webs 100 of the present disclosure may optionally comprise a population of sub-micrometer fibers. In some presently preferred embodiments, the population of sub-micrometer fibers comprises a layer adjoining the nonwoven fibrous web 100. The at least one layer comprising a sub-micrometer fiber component may be an underlayer (e.g. a support layer or collector for the nonwoven fibrous web 100), but more preferably is used as an overlayer or cover layer. The population of sub-micrometer fibers may be co-formed with the nonwoven fibrous web 100, or may be pre-formed as a web roll (see e.g. web rolls 260 and 262 in FIG. 3) before forming the nonwoven fibrous web 100 and unrolled to provide a collector (see e.g. web roll 260 and collector 232 in FIG. 3) or cover layer (see e.g. web roll 262 and cover layer 230 in FIG. 3) for the nonwoven fibrous web 100, or alternatively or additionally may be post-formed after forming the nonwoven fibrous web 100, and applied adjoining, preferably overlaying, the nonwoven fibrous web 100 (see e.g. post-forming applicator 216 applying fibers 218 to nonwoven fibrous web 100 in FIG. 3).

In exemplary embodiments in which the population of sub-micrometer fibers is co-formed with the nonwoven fibrous web 100, the population of sub-micrometer fibers may be deposited onto a surface of the nonwoven fibrous web 100 so as to form a population of sub-micrometer fibers at or near the surface of the web. The method may comprise a step wherein the nonwoven fibrous web 100, which optionally may include a support layer or collector 232, is passed through a fiber stream of sub-micrometer fibers having a median fiber diameter of less than 1 micrometer (μm). While passing through the fiber stream, sub-micrometer fibers may be deposited onto the nonwoven fibrous web 100 so as to be temporarily or permanently bonded to the support layer. When the fibers are deposited onto the support layer, the fibers may optionally bond to one another, and may further harden while on the support layer.

The population of sub-micrometer fibers may be co-formed with the nonwoven fibrous web 100, or may be pre-formed as a web roll (see e.g. web rolls 260 and 262 in FIG. 3) before forming the nonwoven fibrous web 100 and unrolled to provide a collector (see e.g. web roll 260 and collector 232 in FIG. 3) or cover layer (see e.g. web roll 262 and cover layer 230 in FIG. 3) for the nonwoven fibrous web 100, or alternatively or additionally, may be post-formed after forming the nonwoven fibrous web 100, and applied adjoining, preferably overlaying, the nonwoven fibrous web 100 (see e.g. post-forming applicator 216 applying fibers 218 to nonwoven fibrous web 100 in FIG. 3).

Following formation, the nonwoven fibrous web 100 passes, in some exemplary embodiments, through the heating unit 240, which melts and then coalesces the first regions to secure the nonwoven fibrous web 100 and also secure, in certain exemplary embodiments, the chemically active particulates (130, 130'). An optional binder coating could also be included in some embodiments. Thus in one exemplary embodiment, the nonwoven fibrous web 100 could proceed to a post-forming processor 250, for example, a coater wherein a liquid or dry binder could be applied to at least one major surface of the nonwoven fibrous web (e.g. the top surface, and/or the bottom surface). The coater could be a roller coater, spray coater, immersion coater, powder coater or other known coating mechanism. The coater could apply the binder to a single surface of the nonwoven fibrous web 100 or to both surfaces.

If applied to a single major surface, the nonwoven fibrous web 100 may proceed to another coater (not shown), where the other major uncoated surface could be coated with a binder. It is understood that if an optional binder coating is included, that the chemically active particulate should be capable of withstanding the coating process and conditions, and the surface of the chemically active particulates should not be substantially occluded by the binder coating material.

Other post processing steps may be done to add strength or texture to the nonwoven fibrous web 100. For example, the nonwoven fibrous web 100 may be needle punched, calendered, hydro-entangled, embossed, or laminated to another material in post-forming processor 250.

G. Methods of Using Nonwoven Fibrous Webs with Chemically Active Particulates

Any of the foregoing exemplary embodiments of nonwoven fibrous webs 100 comprising a plurality of discrete fibers 200 and a plurality of chemically active particulates 130 may be used to make an article selected from a gas filtration article, a liquid filtration article, a surface cleaning article, an insulation article, a cellular growth support article, a drug delivery article, a personal hygiene article, and a wound dressing article.

In certain presently preferred embodiments, the nonwoven fibrous web of any of the foregoing embodiments may be used to make a fluid filtration article comprising a fluid-impermeable housing surrounding the nonwoven fibrous web, the housing comprising at least one fluid inlet in fluid communication with a first major surface of the nonwoven fibrous web, and at least one fluid outlet in fluid communication with a second major surface of the nonwoven fibrous web opposite the first major surface of the nonwoven fibrous web.

It is understood that a variety of filtration articles can be made from various nonwoven fibrous webs containing various chemically active particulates. Liquid (e.g. water) filtration media, gas (e.g. air) filtration media, furnace filters, respirators, and the like could beneficially manufactured to include nonwoven fibrous webs containing chemically active particulates.

FIG. 4A illustrates an exemplary embodiment of a multi-layer composite nonwoven fibrous web 234 comprising a nonwoven fibrous web 100 further comprising a plurality of discrete fibers 200 and a plurality of chemically active particulates 130 useful in producing a fluid filtration medium or element. The multi-layer composite fibrous web 234 illustrated in FIG. 4A comprises three webs 230, 100 and 232, adjoined to form three distinct layers having a total thickness of T. In the illustrated embodiment, a first support or cover layer 232 (which comprises a plurality of fibers 116) having a thickness T''' is overlaid by a second layer having a thickness T'' formed by nonwoven fibrous web 100 (which comprises a plurality of discrete fibers 200 and a plurality of chemically active particulates 100), which is overlaid by a third layer having a thickness T' formed by cover layer 230 (comprising a plurality of fibers 212, which preferably comprise a population of sub-micrometer fibers having a median diameter of less than one micrometer).

FIG. 4B illustrates another exemplary embodiment of a composite nonwoven fibrous web 234' comprising a nonwoven fibrous web 100 further comprising a plurality of discrete fibers 200 and a plurality of chemically active particulates 100 useful in producing a fluid filtration medium or element. The composite fibrous web 234' has an overall thickness T, and does not comprise discrete layers, but rather, has a cover region of fibers 218 (having thickness T') overlaying the plurality of discrete fibers 200 and the plurality of chemically active particulates 100 (defining a particulate-loaded region having thickness T''). The cover region 230 of fibers 218 preferably comprises a population of sub-micrometer fibers having a median size or diameter less than 1 µm. The region 230 may be pre-formed or co-formed, as described above.

In other exemplary embodiments (not shown), additional layers may be formed by additional overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the thickness T of the composite nonwoven fibrous web 234'.

In certain presently preferred embodiments, the fluid filtration medium comprises a first layer comprising a population of microfibers having a population median diameter of at least 1 µm, and a second layer overlaying the first layer comprising a population of sub-micrometer fibers having a population median diameter less than 1 µm. In some exemplary embodiments, the first layer adjoins the porous support. Such a fluid filtration medium may be particularly useful for depth filtration applications in which the first layer comprising the population of microfibers is contacted by a permeating fluid before the second layer comprising the population of sub-micrometer fibers.

In other exemplary embodiments (not shown), the second layer adjoins the porous support. Such a fluid filtration medium may be particularly useful for absolute filtration applications in which the first layer comprising the population of microfibers is contacted by a permeating fluid after the second layer comprising the population of sub-micrometer fibers.

In another exemplary embodiment (not shown) provides that the fluid filtration article element a sorbent density gradient in an axial configuration. An alternative exemplary embodiment (not shown) provides that the fluid filtration element has a sorbent density gradient in a radial configuration. In one particular embodiment, the fluid filtration element further comprises a plurality of layers of a second web of self-supporting nonwoven polymer fibers that are substantially free of sorbent particulates.

In another exemplary embodiment (not shown), the disclosure provides a fluid filtration element comprising two or more porous layers wound to form a porous fluid filtration article, wherein the porous layers comprise a web of self-supporting nonwoven polymeric fibers and a plurality of chemically active particulates enmeshed in the web. The fluid filtration article may also include a fluid-impermeable housing surrounding the porous article, an inlet in fluid communication with a first (coarse fiber) layer, which may be an overlayer or an underlayer; and an outlet in fluid communication with a second (fine fiber) layer, which may correspondingly be an underlayer or an overlayer.

In certain exemplary embodiments, the housing may include at least one fluid inlet in fluid communication with a first layer comprising a population of microfibers having a population median diameter of at least 1 µm, and at least one fluid outlet in fluid communication with a second layer comprising a population of sub-micrometer fibers having a population median diameter less than 1 µm, adjoining the first layer. In one exemplary embodiment, the first and second layers may be fused together. In another exemplary embodiment, the porous layers are separate composite layers.

Figure 5:
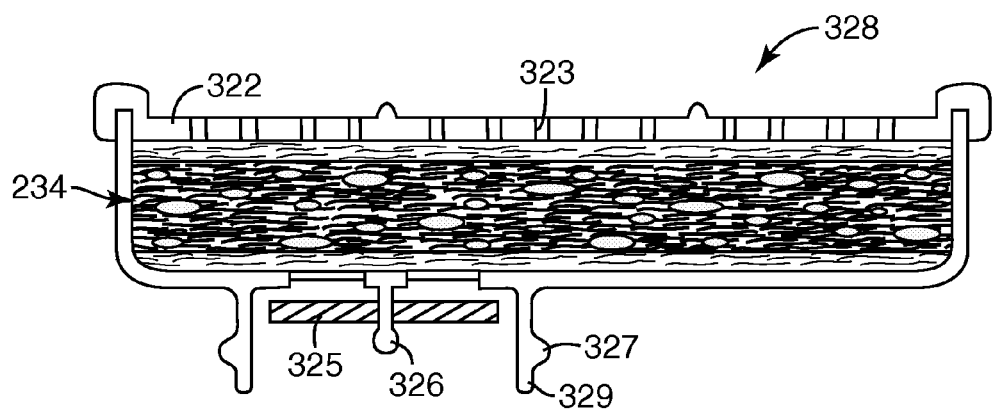
FIG. 5 is a side view of an exemplary embodiment of a fluid filtration article using the multilayer nonwoven fibrous web of FIG. 4A, according to another exemplary embodiment of the present disclosure.

FIG. 5 is an exemplary fluid filtration article 328 (e.g. a fluid filter element for a personal protection respirator) illustrating use of the exemplary multi-layer composite nonwoven fibrous web or filtration element 234 of FIG. 4A, wherein the fluid may be a gas such as, for example, air. While FIG. 5 is described in terms of gas filtration, it is to be understood that other fluids, for example liquids (e.g., water), may be used in other filtration applications. Composite nonwoven fibrous web or filtration element 234 comprises three overlaid webs or layers 230, 100 and 232, adjoined to form three distinct layers having a total thickness of T.

In the illustrated embodiment, a first support or cover layer 232 (which comprises a plurality of fibers 116) having a thickness T''' is overlaid by a second layer having a thickness T'' formed by nonwoven fibrous web 100 (which comprises a plurality of discrete fibers 200 and a plurality of chemically active particulates 100), which is overlaid by a third layer having a thickness T' formed by cover layer 230 (comprising a plurality of fibers 212, which preferably comprise a population of sub-micrometer fibers having a median diameter of less than one micrometer).

In other embodiments (not shown), additional layers may be formed by additional adjoining overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the thickness T of the composite nonwoven fibrous web or filtration element 234.

The interior of exemplary fluid (e.g., gas) filtration article 328 can be at least partially filled with the composite nonwoven fibrous web or filtration element 234. Housing 329, including perforated cover 322, surrounds composite nonwoven fibrous element 234. The housing 329 includes at least one fluid inlet 323 in fluid communication with the first layer 20, and at least one fluid outlet 25 in fluid communication with the second layer 10'. For example, as shown in FIG. 5, fluid (e.g., ambient air) enters filtration article 328 through fluid (e.g., gas) inlet openings 323 in perforated cover 322 of housing 329, passes through composite nonwoven fibrous web or filtration element 234 (whereupon potentially hazardous substances in such fluid may be absorbed and/or adsorbed by the plurality of chemically active particulates 130 distributed in nonwoven fibrous web 100) and exits fluid (e.g., gas) filtration article 328 through fluid outlet opening 325 (e.g., air valve 325 mounted on support 326 of housing 329. Flange 327 enables fluid (e.g., gas) filtration article 328 to be replaceably attached to a fluid (e.g., gas) filtration device such as a respirator (not shown). Suitable respirators are known to those skilled in the art.

As illustrated in FIG. 5, the exemplary fluid (e.g., gas) filtration article 328 uses the composite nonwoven fibrous web or filtration element 234 shown in FIG. 4A. In alternative embodiments, other composite nonwoven fibrous articles, for example, those illustrated or described in the description of FIGS. 1A-1C, and 4B may be used. In one alternative embodiment (not shown), a first (e.g., microfiber) layer may overlay a second (e.g., fine fiber) layer. In other embodiments (not shown), additional layers may be formed by additional overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration) across the thickness T of the composite nonwoven fibrous webs or filtration elements 234', as illustrated in FIG. 4B. The additional layers (not shown) may include an optional support layer (not shown) as described herein.

The fluid filtration article may take a variety of shapes and forms. In certain exemplary embodiments, the fluid filtration article takes the form of a three-dimensional geometric shape, which in certain exemplary embodiments, may be selected from a cylinder, a circular disc, an elliptical disk, or a polygonal disk. Other suitable shapes and forms are known to those skilled in the art.

A further aspect provides a method of filtering a fluid, the method comprising contacting a fluid filtration article with a permeating fluid. In certain exemplary embodiments, the fluid filtration article comprises a nonwoven fibrous web (or web stack) comprising a plurality of porous layers wound to form a porous article, wherein the porous layers comprise a web of self-supporting nonwoven polymeric fiber layers as previously described, and optionally, a plurality of sorbent particulates enmeshed in the web; a fluid-impermeable housing surrounding the porous article; an inlet in fluid communication with the first surface; and an outlet in fluid communication with the second surface.

In certain exemplary embodiments, the nonwoven fibrous web 100 (or multi-layer fibrous web 234 or composite web 234') comprises a first layer or region comprising a population of microfibers having a population median diameter of at least 1 µm, and a second layer or region overlaying the first layer or region and comprising a population of sub-micrometer fibers having a population median diameter less than 1 µm. In some exemplary embodiments, the first layer or region adjoins the porous support, which is preferably nonwoven fibrous web 100, comprising a plurality of discrete fibers, and a plurality of chemically active particulates.

The exemplary presently disclosed fluid filtration articles may be used in a variety of ways. In one exemplary embodiment, a permeating fluid passes through the first layer before passing through the second layer. In another exemplary embodiment, a permeating fluid passes through the second layer before passing through the first layer. In a further exemplary embodiment, the second layer is pleated, and the permeating fluid passes through the second layer before passing through the first layer.

In some embodiments, a permeating liquid may be passed through the fluid filtration article under the force of gravity. In other exemplary embodiments, a permeating fluid, which may be a liquid or a gas, may be passed through the fluid filtration article under conditions of pressurized fluid flow, for example, using a liquid pump, gas blower or gas compressor. In some exemplary embodiments, fluid filtration articles according to exemplary presently disclosed embodiments may exhibit reduced pressure drop under conditions of pressurized fluid flow.

Exemplary embodiments of nonwoven fibrous webs including chemically active particulates have been described above and are further illustrated below by way of the following Examples, which are not to be construed in any way as imposing limitations upon the scope of the present invention. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials
Fibers

Bi-component fiber of the type TREVIRA T255 (commercially available from Trevira GmbH, Bobingen, Germany), having 1.3 denier and 3 mm length.

Bi-component fiber of the type TREVIRA T255 (commercially available from Trevira GmbH, Bobingen, Germany) having 1.3 denier and 6 mm length.

Bi-component fiber of the type LMF (a PET/PET bicomponent fiber commercially available from HuVis, Samseong-dong, Seoul, South Korea) having 2 denier and 3.8 cm nominal length.

Monocomponent PP fiber (a thermoplastic polypropylene commercially available from FiberVisions, Inc., Duluth, Ga.) having 4 denier and 1.875" (4.76 cm) length.

Monocomponent PET fiber (a thermoplastic polyethylene terephthalate polyester, PET, commercially available from Invista in Wichita, Kans.) having 6 denier and 1.5" (3.81 cm) length.

Monocomponent undrawn PET fiber PSBNF (an undrawn, melty thermoplastic polyethylene terephthalate polyester, PET, commercially available from MiniFibers, Inc., Johnson City, Tenn.) having 25 dtex×3 mm length.

Monocomponent natural soybean (i.e. soy) fiber (a 2 denier, 7 cm nominal length fiber commercially available as ECORA from China Soybean Protein Fiber Co., Jiangsu, China).

Monocomponent regenerated bamboo fiber (a 1.56 dtex× 38 mm nominal length fiber commercially available as TIANZHU from HeBei JiGao Chemical Fiber Co., HeBei, China).

Chemically Active Particulates

Activated carbon of the type 30×60 CTC 60 (commercially available from Kuraray Chemicals Co., Ltd., Osaka, Japan).

Activated carbon granule of the type 300 MD (commercially available from Kuraray Chemicals Co., Ltd., Osaka, Japan).

Activated carbon granule of the type 12×20 GG (commercially available from Kuraray Chemicals Co., Ltd., Osaka, Japan).

Activated carbon granule of the type 60×150 GG (commercially available from Kuraray Chemicals Co., Ltd., Osaka, Japan).

Ion exchange resin beads (weak cation exchange resin) of the type PUROLITE C107E (commercially available from Purolite International, Ltd., Llantrisant, Wales, United Kingdom).

Fibrous Support Layers (Collectors)

Support Layer 1: JM688-80 with a basis weight of 80 g/m² (commercially available from Johns Manville GmbH, Berlin, Germany).

Support Layer 2: KB1800 (commercially available from ABENA-Finess, Kisa, Sweden).

Optional Binders

Binder (adhesive) for activated carbon containing nonwoven fibrous web of Example 2(LCC): Eastoflex hotmelt adhesive type E1220PL, Propylene-ethylene copolymer-based, commercially available from Eastman Chemical Company, Kingsport/TN, USA. Binder (adhesive) for web lamination: 3M Spray-Mount, commercially available from 3M Company, St. Paul, Minn., USA.

Test Methods
Pressure Drop Test of Pleated Filter

The samples of pleated composite filter were tested according to DIN 71460-1. The samples had a pleat height of 30 mm, a pleat distance of 10 mm. The pleated filter media was held in a filter cassette made of polyester frame with an area of 50000 mm²=0.05 m² having dimensions of 250 mm in length and 200 mm in width. The resulting number of pleats was 25. Therefore, the effective filter area Aeff=2×pleat height×width×no. of pleats=0.3 m². The air flow value was increased during the test from 100 and 600 m³/h. The results were recorded in [Pa].

Gas Efficiency Test of Pleated Filter

The samples of pleated composite filter were tested according to DIN 71460-2. The samples had a pleat height of 30 mm, a pleat distance of 10 mm. The pleated filter media was held in a filter cassette made of polyester frame with an area of 50000 mm²=0.05 m² having dimensions of 250 mm in length and 200 mm in width. The resulting number of pleats was 25. Therefore, the effective filter area Aeff=2×pleat height×width×no. of pleats=0.3 m².

The air flow was 180 m³/h. The test ran for 15 min. for n-Butane and for Toluene. The results were recorded in [%].

Basis Weight Measurement

The basis weight for exemplary nonwoven fibrous webs containing chemically active particulates was measured with a weighing scale METTLER AT400 or XS40002S, (commercially available from Mettler-Toledo SAS, Viroflay, France).

Micrographs

Exemplary nonwoven fibrous webs containing chemically active particulates were visually inspected using an Olympus Microscope of the type SZX12 (commercially from Olympus, Center Valley, Pa.), equipped with a camera head of the type Nikon Digital Sights DS Fil (commercially available from Nikon Instruments Europe B. V., Amstelveen, Netherlands).

Preparative Example A

Preparation of a Meltblown Nonwoven Fibrous Web Support Layer

A melt blown nonwoven web was prepared as follows. Oligomeric hindered amine CHIMASSORB 944FL (available from Ciba-Geigy Corp., Hawthorne, N.Y.) was melt compounded into poly(4-methyl-1-pentene) (TPX DX 820, available from Mitsui Petrochemical Industries, Tokyo, Japan) in a single screw extruder in a 40:60 ratio and the resultant blend was extruded into a large diameter fiber. The fiber was subsequently ground into a powder (0.125 inch mesh). The powder was added to polypropylene pellets (a 400 melt flow index polypropylene resin available from Exxon Corp., Houston, Tex.) feed during preparation of melt blown microfiber web to obtain a polypropylene resin composition consisted of 98 wt. % polypropylene, 1.2 wt. % poly(4-methyl-1-pentene), and 0.8 wt. % CHIMASSORB 944FL.

This resin blend was fed into an extrusion process for preparing a melt blown microfiber web using a melt blowing process similar to that described, for example, in Wente, "SuperfineThermoplastic Fibers," in Industrial Engineering Chemistry, Vol. 48, pages 1342 et seq (1956) or in Report No. 4364 of the Naval Research Laboratories, published May 25, 1954, entitled "Manufacture of Superfine Organic Fibers" by Wente et al. The extruder had four temperature control zones which were maintained at 250° C., 290° C., 320° C., and 320° C., the flow tube connecting the extruder to the die (with 25 holes) was maintained at 300° C., and melt blown die was maintained at 300 DC.

The primary air temperature was maintained at about 400° C. and 690 kilopascals (kPa) with a 0.076 cm gap width, to produce a uniform web. The polypropylene resin composition described above was delivered from the die at a rate of 0.3 g/hole/min. and the resulting web collected on a perforated rotating drum collector positioned at the collector/die distance 15 inches. The collector drum was connected to a vacuum system which could be optionally turned on or off while collecting the melt blown microfiber web, thereby allowing a higher Solidity web to be prepared when a vacuum was applied to the collector drum. In all cases, lower basis weight BMF webs were obtained by increasing the rotational speed of the collector rather than reducing the resin delivery rate. The average effective fiber diameter (EFD) for the webs obtained from this process was 12 μm.

The basis weight of the web was 30 g/m$^2$. The prepared web was subsequently charged using a hydro-charging process substantially as described in U.S. Pat. No. 5,496,507 (Angadjivand et al.) using a water pressure of about 100 psi (690 kPa). No pre- or post-charging treatment was applied. The charged meltblown web material was wound on a roll for further processing to prepare the composite filter media.
Preparation of Nonwoven Fibrous Webs Comprising Chemically Active Particulates In each of the following Examples, a SPIKE air-laying forming apparatus (commercially available from FormFiber NV, Denmark) was used to prepare nonwoven fibrous webs containing a plurality of discrete fibers and a plurality of chemically active particulates. Details of the SPIKE apparatus and methods of using the SPIKE apparatus in forming air-laid webs is described in U.S. Pat. Nos. 7,491,354 and 6,808,664.

Example 1a

Nonwoven Fibrous Web

An activated carbon-containing fibrous web was prepared by feeding activated carbon particulates and bi-component fibers into a split pre-opening and blending chamber with two rotating spike rollers with a conveyor belt with a width of 0.6 m at a velocity 1 m/min. The activated carbon particulates were fed with a mass flowrate of 252 g/min to this chamber to obtain a basis weight of activated carbon particulates of 420 g/m$^2$ in the web. The bi-component fibers were simultaneously fed with a mass flowrate of 18 g/min to this chamber onto the same conveyor belt to obtain a basis weight of 30 g/m$^2$ in the web (equal to 6.6% by weight of the basis weight of the activated carbon particulates and the bi-component fibers). Thereafter, the blend was fed into the top of the forming chamber having a blower having a flow rate of 2300 m$^3$/h and set up at 55 to 60% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again same the endless belt screen. The materials were pulled down on a porous endless belt/wire by a combination of gravity and vacuum applied to the forming chamber from the lower end of the porous forming belt/wire.

A support layer of the type JM 688-80 (Support Layer 1) was fed into the forming chamber on the top surface of the endless forming belt/wire running at the lower end of the forming chamber moving at a speed of 1 m/min. The materials were collected on the top surface of the support layer thereby forming a three-dimensional fiber nonwoven fibrous web containing the activated carbon particulates supported by the support layer underneath.

The web was then conveyed into a gas oven (150-155° C.) with a line speed of 1 m/min, which melts the sheath of the bi-component fibers. In this example, the web was removed immediately after the oven. The gas oven is a Cavitec laboratory gas oven. It is split into 2 separate heating chambers of 2 meters long with independent process parameters settings; the principle is air blowing in the chambers; air can be blown in the chambers from the top, the bottom or intermediate with a mechanical switch; the circulation can be set so that a part of the blown air can be evacuated (20 to 100% setup) and a part can be re-circulated (20-100% setup). In this example the air was blown from the top (to lie flat the nonwoven fibrous web), evacuated at 80% setting and re-circulated at 20% on both chambers, the temperature was respectively 150 and 155° C. in the chambers. The sample was passed once in the chamber.

The resulting three-dimensional fiber nonwoven fibrous web of the web was an open, lofty web and was visually observed to have activated carbon particulates homogenously distributed within the obtained three-dimensional fiber nonwoven fibrous web.

Example 1b

Nonwoven Fibrous Web

This activated carbon-containing fibrous web was made like the nonwoven fibrous web of Example 1a, except that the amount of activated carbon particulates and bi-component fibers fed into the forming chamber was different. Here, 396 g/min of activated carbon particulates were fed into the chamber with the same conveyor belt as described above (with a width of 0.6 m was running at a velocity of 1 m/min as well) to obtain a basis weight of 660 g/m$^2$ activated carbon of the type Kuraray 30×60 CTC 60 in the web. The mass flowrate of fibers simultaneously fed to the chamber onto the same conveyor belt was 27 g/min to obtain a basis weight of 45 g/m$^2$ of bi-component fibers in the web. Thereafter was fed into the forming chamber and processed as described above.

Example 1c

Nonwoven Fibrous Web

This activated carbon-containing web was made like the nonwoven fibrous web of Example 1a, except that after exposing the activated carbon containing web to an oven, the support layer (i.e. collector) was removed from the activated carbon containing web.

Example 2

Nonwoven Fibrous Web

This activated carbon containing web was made like the nonwoven fibrous web of Example 1a, except that activated carbon particulates in an amount of 420 g/m$^2$ were mixed with an amount of 74 g/m$^2$ adhesive of the type Eastoflex E1220PL (representing 15% by weight of the basis weight of activated carbon particulates and the adhesive) and formed into an activated carbon containing web on Support Layer 1.

Example 3a

Nonwoven Fibrous Web

An ion exchange resin bead-containing web was prepared by feeding ion exchange beads of the type PUROLITE C107E with a mass flowrate of 504 g/min chamber were fed into a split pre-opening and blending chamber with two rotating spike rollers with a conveyor belt of 0.6 m width running at a velocity of 1 m/min to obtain a basis weight of 840 g/m² in the web.

Bi-component TREVIRA T255 fibers having 1.3 denier and a length of 3 mm with a mass flowrate of 24 g/min were simultaneously fed into the chamber onto the same conveyor belt to obtain a basis weight of 40 g/m² in the web (equal to 4.5% by weight of the basis weight of the ion exchange beads containing web). Thereafter, the blend was fed into the top of the forming chamber having a blower having a nominal capacity flow rate of 2300 m³/h and a set-up at 80 to 90% of its nominal capacity with the same conveyor belt.

The fibrous materials were opened and fluffed in the top of the chamber and then fell through the upper row of spikes rollers and endless belt screen to the bottom of the forming chamber thereby passing the lower rows of spike roller and again the endless conveyor belt screen. The materials were pulled down on a porous endless forming belt/wire by a combination of gravity, bottom spiked rolls directions and speeds (set-up) and vacuum applied to the forming chamber from the lower end of the porous forming belt/wire.

A support layer of the type KB1800 from ABENA-Finess (Support Layer 2) was fed to the forming chamber on the top surface of an endless forming belt running at the lower end of the forming chamber at a line speed of 1 m/min. The nonwoven fibrous web was collected on the top surface of the support layer.

The web was then conveyed into an oven (140-150° C.) with a line speed of 1 m/min, which was found sufficient to melt the sheath of bi-component fiber. In this example, the web was removed immediately after the oven. The oven had three zones with different air velocities for the air blown onto the web with an air velocity 20 m/s, 35 m/s and 35 m/s. In this example the air was blown from the top (to lie flat the nonwoven fibrous web), evacuated at 80% setting and re-circulated at 20% for first chamber, evacuated at 70% setting and re-circulated at 30% for second chamber, and evacuated at 50% setting and re-circulated at 50% for third chamber. At this stage, the support layer was removed from the obtained pre-solidified ion exchange beads containing web. The resulting three-dimensional fiber nonwoven fibrous web of the web was an open, dense web and was visually observed to have ion exchange beads homogenously distributed with the obtained three-dimensional fiber nonwoven fibrous web.

The obtained ion exchange beads containing web was further processed in that the web was folded over onto itself at a fold line in machine direction arranged in the middle of the web to obtain a web consisting of two layers of the same web. The obtained web is further bonded and solidified, respectively, by exposing it to the oven with air blown onto the web again. The oven had again three zone, and the air was blown from the top (to lie flat the nonwoven fibrous web), evacuated at 50% setting and re-circulated at 50% for all chambers. Due to this second passing through the oven, the two web layers obtained by folding the web back onto itself was bonded at the layer interface, due to the re-melting of the sheath of the bi-component fibres, and further web bonding and solidification. Also, the thickness was first increased due to the folding operation to twice of the web and then decreased due to the hot air stream directed onto the web.

Example 3b

Nonwoven Fibrous Web

The ion exchange resin bead-containing web was prepared as described for the nonwoven fibrous web of Example 3a, except that the TREVIRA T255 fibers fed into the forming chambers were of the type had having 1.3 denier and a length of 6 mm. The beads were fed to the chamber with a mass flowrate of 288 g/min onto the conveyor belt having a width of 0.6 m and running at a velocity of 1 m/min to obtain a basis weight of 480 g/m² for the PUROLITE C107E ion exchange beads in the web. The fibers were simultaneously fed into the chamber onto the same conveyor belt with a mass flowrate of 18 g/min to obtain a basis weight of fibers of 30 g/m² for the bi-component TREVIRA T255 fibers in the web. The discrete fibers were thereafter fed into the forming chamber and processed as described above.

Example 4a

Nonwoven Fibrous Web

An activated carbon containing web was prepared by feeding activated carbon particulates of the type 300 MD and thermoplastic monocomponent fibers of the type PP and PET into a split pre-opening and blending chamber with two rotating spike rollers with a conveyor belt with a width of 0.6 m at a velocity of 1 m/min. The activated carbon particulates were fed with a mass flow rate of 400 g/min to the lower portion of this chamber from the downstream side to obtain a basis weight of activated carbon particulates of 125 g/m² in the web. No water spray was used.

The mono-component fibers were simultaneously fed with a mass flow rate of 60 g/min to this chamber onto the same conveyor belt to obtain a basis weight of 100 g/m² in the web. Thereafter, the blend was fed into the top of the forming chamber having a blower having a flow rate of 2300 m³/h and set up at 60% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again same the endless belt screen. The materials were pulled down on a porous endless belt/wire by a combination of gravity and vacuum applied to the forming chamber from the lower end of the porous forming belt/wire.

The web was then conveyed into a gas oven (160° C.) with a line speed of 1 m/min, which melted the lower melting of the two mono-component fibers. In this example, the web was removed immediately after exiting the oven. The oven is a forced convection oven (commercially available from ITS Corp., Milwaukee, Wis.). It has one heating chamber of 5.5 meters long and 0.75 meters wide with independent process parameters settings; heating is provided by forced air convection of heated air entering from the top of the heating chamber. The circulation can be set so that a portion of the heated air can be vented from the oven (40% of the heated air was evacuated in this example) and a portion of the heated air can be re-circulated back into the oven (40% of the heated air was re-circulated in this example). The sample was passed once through the heating chamber.

Example 4b

Nonwoven Fibrous Web

The LMF bi-component fibers and the ECORA soybean fibers were fed into a split pre-opening and blending chamber with two rotating spike rollers with a conveyor belt with a width of 0.6 m at a velocity 0.7 m/min. The bi-component fibers were fed with a mass flowrate of 20 g/min to this chamber onto this conveyor belt to obtain a basis weight of 20 g/m² in the web (equal to 3% by weight of the basis weight of the activated carbon particulates and the bi-component and soybean fibers). The soybean fibers were fed with a mass flowrate of 80 g/min to this chamber onto this conveyor belt to obtain a basis weight of 80 g/m² in the web (equal to 13% by weight of the basis weight of the activated carbon particulates and the bi-component and soybean fibers). Thereafter, the blend was fed into the top of the forming chamber having a blower having a flow rate of 2300 m³/h and set up at 48% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again same the endless belt screen.

The activated carbon particulates in this activated carbon-containing fibrous web were fed with a mass flowrate of 400 g/min and delivery air setting of 22 psi to the lower end of the forming chamber to obtain a basis weight of activated carbon particulates of 500 g/m² in the web (equal to 84% by weight of the basis weight of the activated carbon particulates and the bi-component and soybean fibers). A K-Tron feeder, type K-SFS-24/6 (commercially available from K-Tron Schweiz AG in Niederlenz, Switzerland), was used to deliver these activated carbon particulates.

The materials were pulled down on a porous endless belt/wire by a combination of gravity and vacuum applied to the forming chamber from the lower end of the porous forming belt/wire. A support layer of the type JM 688-80 (Support Layer 1) was fed into the forming chamber on the top surface of the endless forming belt/wire running at the lower end of the forming chamber moving at a speed of 2 m/min. The materials were collected on the top surface of the support layer thereby forming a three-dimensional fiber nonwoven fibrous web containing the activated carbon particulates supported by the support layer underneath.

The web was then conveyed into an electric oven (150-155° C.) with a line speed of 1.1 m/min, which melts the sheath of the bi-component fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 60% setting and re-circulated at 40%, the temperature was 154° C. in the chambers. The sample was passed once in the chamber. The resulting three-dimensional fiber nonwoven fibrous web of the web was an open, lofty web and was visually observed to have activated carbon particulates homogenously distributed within the obtained three-dimensional fiber nonwoven fibrous web.

Example 4c

Nonwoven Fibrous Web

The Trevira T-255 bi-component fibers and the TianZhou regenerated bamboo fibers were fed into a split pre-opening and blending chamber with two rotating spike rollers with a conveyor belt with a width of 0.6 m at a velocity 0.7 m/min. The bi-component fibers were fed with a mass flowrate of 6.3 g/min to this chamber onto this conveyor belt to obtain a basis weight of 12 g/m² in the web (equal to 1.5% by weight of the basis weight of the activated carbon particulates and the bi-component and regenerated bamboo fibers). The regenerated bamboo fibers were fed with a mass flowrate of 63.7 g/min to this chamber onto this conveyor belt to obtain a basis weight of 118 g/m² in the web (equal to 14.2% by weight of the basis weight of the activated carbon particulates and the bi-component and regenerated bamboo fibers). Thereafter, the blend was fed into the top of the forming chamber having a blower having a flow rate of 2300 m³/h and set up at 50% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again same the endless belt screen.

The Kuraray GG 12×20 activated carbon particulates in this activated carbon-containing fibrous web were fed with a mass flowrate of 400 g/min and delivery air setting of 10 psi to the lower end of the forming chamber to obtain a basis weight of activated carbon particulates of 700 g/m² in the web (equal to 84.3% by weight of the basis weight of the activated carbon particulates and the bi-component and regenerated bamboo fibers). A K-Tron feeder, type K-SFS-24/6 (commercially available from K-Tron Schweiz AG in Niederlenz, Switzerland), was used to deliver these activated carbon particulates.

The materials were pulled down on a porous endless belt/wire by a combination of gravity and vacuum applied to the forming chamber from the lower end of the porous forming belt/wire. A support layer of the type JM 688-80 (Support Layer 1) was fed into the forming chamber on the top surface of the endless forming belt/wire running at the lower end of the forming chamber moving at a speed of 1 m/min. The materials were collected on the top surface of the support layer thereby forming a three-dimensional fiber nonwoven fibrous web containing the activated carbon particulates supported by the support layer underneath.

The web was then conveyed into an electric oven (125-130° C.) with a line speed of 1.1 m/min, which melts the sheath of the bi-component fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 60% setting and re-circulated at 40%, the temperature was 157° C. in the chambers. The sample was passed once in the chamber. The resulting three-dimensional fiber nonwoven fibrous web of the web was an open, lofty web and was visually observed to have activated carbon particulates homogenously distributed within the obtained three-dimensional fiber nonwoven fibrous web.

Example 4d

Nonwoven Fibrous Web

The Trevira T-255 bi-component fibers and the TianZhu regenerated bamboo fibers were fed into a split pre-opening and blending chamber with two rotating spike rollers with a conveyor belt with a width of 0.6 m at a velocity 0.7 m/min. The bi-component fibers were fed with a mass flowrate of 6.3 g/min to this chamber onto this conveyor belt to obtain a basis weight of 10 g/m$^2$ in the web (equal to 7.7% by weight of the basis weight of the activated carbon particulates and the bi-component and regenerated bamboo fibers). The regenerated bamboo fibers were fed with a mass flowrate of 63.7 g/min to this chamber onto this conveyor belt to obtain a basis weight of 105 g/m$^2$ in the web (equal to 80.8% by weight of the basis weight of the activated carbon particulates and the bi-component and regenerated bamboo fibers). Thereafter, the blend was fed into the top of the forming chamber having a blower having a flow rate of 2300 m$^3$/h and set up at 50% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again the same endless belt screen.

The Kuraray GG 12×20 activated carbon particulates in this activated carbon-containing fibrous web were fed with a mass flowrate of 26 g/min and delivery air setting of 20 psi to the lower end of the forming chamber to obtain a basis weight of activated carbon particulates of 15 g/m$^2$ in the web (equal to 11.5% by weight of the basis weight of the activated carbon particulates and the bi-component and regenerated bamboo fibers). A K-Tron feeder, type K-SFS-24/6 (commercially available from K-Tron Schweiz AG in Niederlenz, Switzerland), was used to deliver these activated carbon particulates.

The materials were pulled down on a porous endless belt/wire by a combination of gravity and vacuum applied to the forming chamber from the lower end of the porous forming belt/wire. A support layer of the type JM 688-80 (Support Layer 1) was fed into the forming chamber on the top surface of the endless forming belt/wire running at the lower end of the forming chamber moving at a speed of 1 m/min. The materials were collected on the top surface of the support layer thereby forming a three-dimensional fiber nonwoven fibrous web containing the activated carbon particulates supported by the support layer underneath.

The web was then conveyed into an electric oven (125-130° C.) with a line speed of 1.1 m/min, which melts the sheath of the bi-component fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 60% setting and re-circulated at 40%, the temperature was 157° C. in the chambers. The sample was passed once in the chamber.

The resulting three-dimensional fiber nonwoven fibrous web of the web was an open, lofty web and was visually observed to have activated carbon particulates homogenously distributed within the obtained three-dimensional fiber nonwoven fibrous web.

Example 4e

Nonwoven Fibrous Web

The PSBNF mono-component fibers and the TianZhu regenerated bamboo fibers were fed into a split pre-opening and blending chamber with two rotating spike rollers with a conveyor belt with a width of 0.6 m at a velocity 0.7 m/min. The mono-component fibers were fed with a mass flowrate of 7 g/min to this chamber onto this conveyor belt to obtain a basis weight of 10 g/m$^2$ in the web (equal to 0.9% by weight of the basis weight of the activated carbon particulates and the mono-component and regenerated bamboo fibers). The regenerated bamboo fibers were fed with a mass flowrate of 63 g/min to this chamber onto this conveyor belt to obtain a basis weight of 95 g/m$^2$ in the web (equal to 8.6% by weight of the basis weight of the activated carbon particulates and the mono-component and regenerated bamboo fibers). Thereafter, the blend was fed into the top of the forming chamber having a blower having a flow rate of 2300 m$^3$/h and set up at 60% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again the same endless belt screen.

The Kuraray GG 12×20 activated carbon particulates in this activated carbon-containing fibrous web were fed with a mass flowrate of 700 g/min and delivery air setting of 42 psi to the lower end of the forming chamber to obtain a basis weight of activated carbon particulates of 1000 g/m$^2$ in the web (equal to 90.5% by weight of the basis weight of the activated carbon particulates and the mono-component and regenerated bamboo fibers). A K-Tron feeder, type K-SFS-24/6 (commercially available from K-Tron Schweiz AG in Niederlenz, Switzerland), was used to deliver these activated carbon particulates.

The materials were pulled down on a porous endless belt/wire by a combination of gravity and vacuum applied to the forming chamber from the lower end of the porous forming belt/wire. A support layer of the type JM 688-80 (Support Layer 1) was fed into the forming chamber on the top surface of the endless forming belt/wire running at the lower end of the forming chamber moving at a speed of 1 m/min. The materials were collected on the top surface of the support layer thereby forming a three-dimensional fiber nonwoven fibrous web containing the activated carbon particulates supported by the support layer underneath.

The web was then conveyed into an electric oven (200-205° C.) with a line speed of 1.1 m/min, which melts the sheath of the bi-component fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 80% setting and re-circulated at 20%, the temperature was 204° C. in the chambers. The sample was passed once in the chamber. The resulting three-dimensional fiber nonwoven fibrous web of the web was an open, lofty web and was visually observed to have activated carbon particulates homogenously distributed within the obtained three-dimensional fiber nonwoven fibrous web.

Comparative Example A

Nonwoven Fibrous Web

The PSBNF mono-component fibers and the TianZhou regenerated bamboo fibers were fed into a split pre-opening and blending chamber with two rotating spike rollers with a conveyor belt with a width of 0.6 m at a velocity 0.7 m/min. The mono-component fibers were fed with a mass flowrate of 35 g/min to this chamber onto this conveyor belt to obtain a basis weight of 49 g/m$^2$ in the web (equal to 5% by weight of the basis weight of the activated carbon particulates and the mono-component and regenerated bamboo fibers). The regenerated bamboo fibers were fed with a mass flowrate of 35 g/min to this chamber onto this conveyor belt to obtain a basis weight of 49 g/m$^2$ in the web (equal to 5% by weight of the basis weight of the activated carbon particulates and the mono-component and regenerated bamboo fibers). Thereafter, the blend was fed into the top of the forming chamber having a blower having a flow rate of 2300 m$^3$/h and set up at 50% of its nominal capacity with the same conveyor belt.

The fibrous materials were opened and fluffed in the top of the chamber and then fell through the upper rows of spikes rollers and endless belt screen to the bottom of the forming chamber passing thereby the lower rows of spike rollers and again the same endless belt screen.

The Kuraray GG 12×20 activated carbon particulates in this activated carbon-containing fibrous web were fed with a mass flowrate of 700 g/min and delivery air setting of 42 psi to the lower end of the forming chamber to obtain a basis weight of activated carbon particulates of 882 g/m$^2$ in the web (equal to 90% by weight of the basis weight of the activated carbon particulates and the mono-component and regenerated bamboo fibers). A K-Tron feeder, type K-SFS-24/6 (commercially available from K-Tron Schweiz AG in Niederlenz, Switzerland), was used to deliver these activated carbon particulates.

The materials were pulled down on a porous endless belt/wire by a combination of gravity and vacuum applied to the forming chamber from the lower end of the porous forming belt/wire. A support layer of the type JM 688-80 (Support Layer 1) was fed into the forming chamber on the top surface of the endless forming belt/wire running at the lower end of the forming chamber moving at a speed of 1 m/min. The materials were collected on the top surface of the support layer thereby forming a three-dimensional fiber nonwoven fibrous web containing the activated carbon particulates supported by the support layer underneath.

The web was then conveyed into an electric oven (200-205° C.) with a line speed of 1.1 m/min, which melts the sheath of the bi-component fibers. In this example, the web was removed immediately after the oven. The oven is an electric oven from International Thermal System, LLC (Milwaukee, Wis.). It has one heating chamber of 5.5 meters in length; the principle is air blowing in the chamber from the top. The circulation can be set so that a part of the blown air can be evacuated (20 to 100% setup) and a part can be re-circulated (20-100% setup). In this example the air was evacuated at 80% setting and re-circulated at 20%, the temperature was 204° C. in the chambers. The sample was passed once in the chamber. The resulting three-dimensional fiber nonwoven fibrous web of the web was an open, lofty web and was visually observed to have activated carbon particulates homogenously distributed within the obtained three-dimensional fiber nonwoven fibrous web.

Preparation of Filtration Articles Comprising Nonwoven Fibrous Webs Including Chemically Active Particulates Exemplary fluid filtration articles were prepared using the nonwoven fibrous webs including chemically active particulates described in Examples 1-4.

Example 5

Filtration Article

Figure 6A:
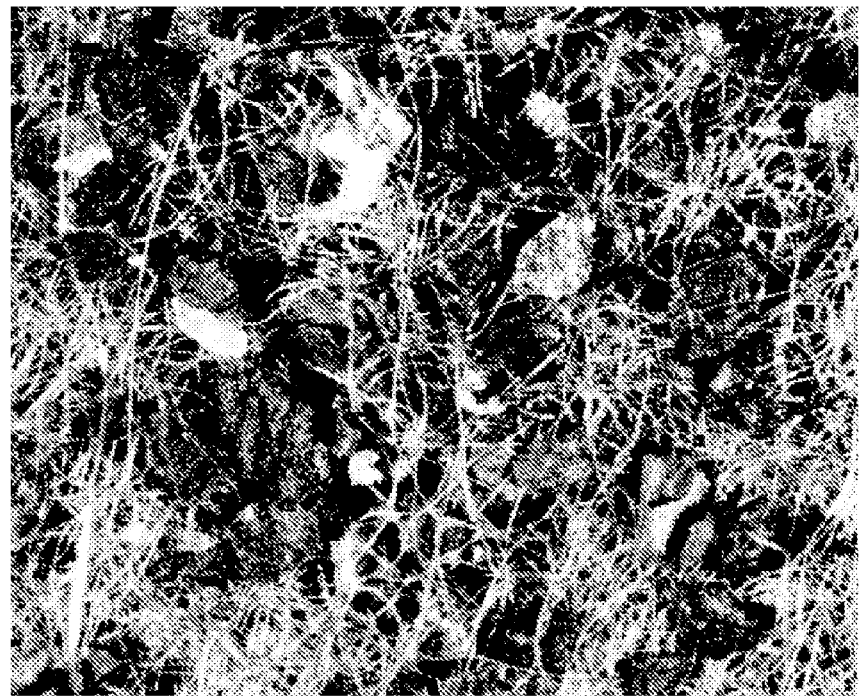

The meltblown nonwoven web was laminated to the top surface of the activated carbon containing nonwoven fibrous web of Example 1a to form a composite filter comprising a particulate filter layer and a gas adsorption layer. 3M Spray mount adhesive (commercially available from 3M Company, St. Paul, Minn.) was applied to the bottom surface of the meltblown nonwoven web in an amount of about 10 g/m$^2$ and then, particulate filter layer comprising the meltblown nonwoven web was pressed onto the gas adsorption layer by hand. The resulting micrographs are shown in FIG. 6A.

The obtained composite filter web comprising the meltblown nonwoven web and the activated carbon containing nonwoven fibrous web of Example 1a as described above was pleated in a Rabowski Blade Pleater (commercially available from Rabowski, Berlin, Germany) to form a pleat pack of the composite filter media. The obtained pleat pack was inserted into a filter cassette of the dimensions 250×200 mm, whereby the edge area of the composite filter media was glued to the frame material of the filter cassette.

The filter cassette comprising the pleated composite filter was exposed to pressure drop testing and gas efficiency testing as described above. The results are displayed in Table 1 (pressure drop tests) and Tables 2-3 (gas efficiency tests for n-butane and toluene).

Example 6

Filtration Article

Figure 6B:

A composite filter was prepared as described in Example 6 except that the activated carbon containing nonwoven fibrous web of Example 1b was used. As described above, in the activated carbon containing web 1b, the amount of activated carbon was 660 g/m$^2$ and the amount of fibers was 45 g/m$^2$. The activated carbon particulates and the fibers were blended and fed into the forming chamber and collected to form the nonwoven fibrous web of Example 1b as described above. The resulting micrographs are shown in FIG. 6B.

The obtained composite filter media comprising the particulate filter layer and the gas adsorption layer was then pleated and inserted in to filter cassette as described in Example 1. The filter cassette comprising the pleated composite filter was exposed to pressure drop testing and gas efficiency testing as described above. The results are displayed in Table 1 (pressure drop tests) and Tables 2-3 (gas efficiency tests for n-butane and toluene).

Example 7

Filtration Article

The ion exchange filter was prepared using the ion exchange bead containing web of Example 3a (made from TREVIRA T255 fibers having 1.3 denier and a length of 3 mm) as described above and formed into a sample of the size 100×100 mm. The basis weight of the obtained samples was measured; the results are shown in Table 4. Subsequently, the samples were cut to a round shape with a diameter of 95 mm. The samples were visually inspected using micrographs to determine the distribution and bonding characteristics of the ion exchange beads within the three-dimensional nonwoven fibrous web.

Example 8

Filtration Article

The ion exchange filter was prepared as substantially as described in Example 8 except that the ion exchange bead containing nonwoven fibrous web of Example 3b was used. The basis weight of the ion exchange beads of the type PUROLITE C107E was 480 g/m² and the basis weight of the bi-component fibers T255 having 1.3 denier and a length of 6 mm was 30 g/m², was used and formed into a sample of the size 100×100 mm. Subsequently, the samples were cut to a round shape with a diameter of 95 mm. The samples were visually inspected using micrographs to determine the distribution and bonding characteristics of the ion exchange beads within the three-dimensional fiber nonwoven web. The resulting micrograph is shown in FIG. 6C (viewed from the back side of the nonwoven fibrous web, showing the chemically active particulates enmeshed or entrapped by the fibers).

Comparative Example 1

Filtration Article

A composite filter comprising a particulate filter layer and a gas efficiency layer was prepared as described in Example 1 except that the activated carbon containing web was prepared differently. Here, the activated carbon containing nonwoven fibrous web of Example 2 was used. Activated carbon particulates in an amount of 420 g/m² were mixed with an amount of 74 g/m² adhesive of the type Eastoflex E1220PL (representing 15% by weight of the basis weight of the activated carbon particulates and the adhesive) to form an activated carbon containing web.

Directly after forming the nonwoven fibrous web containing the activated carbon containing nonwoven fibrous web of Example 2, the meltblown nonwoven web as described above was laminated onto the activated carbon containing nonwoven fibrous web of Example 2 without the addition of adhesive to form the composite filter media. The obtained composite filter web was then calendered through two rolls with a nip pressure of 50 pounds per square inch (345 kPa).

The obtained calendered composite filter web comprising the meltblown nonwoven web and the activated carbon containing web as described above was pleated in a Rabowski Blade Pleater (commercially available from Rabowski, Berlin, Germany) to form a pleat pack of the composite filter media. The obtained pleat pack was inserted into a filter cassette of the dimensions 250×200 mm, whereby the edge area of the composite filter media was glued to the frame of the filter cassette.

Test Results

The obtained filter cassette was exposed to pressure drop testing and gas efficiency testing as described above. Table 1 shows the test results of the pressure drop test of the pleated composite filter as described above for Examples 5 and 6 and Comparative Example 1. Table 2 shows the test results of the gas efficiency test with n-butane for Examples 5 and 6 and Comparative Example 1. Table 3 shows the test results of the gas efficiency test of the pleated composite filter with toluene for Examples 5 and 6 and Comparative Example 1. Table 4 shows the results of basis weight measurements for Examples 7 and 8.

TABLE 1

Test Results Of Pressure Drop Test for Examples 6-7 and Comparative Example 1

| Aiflow [m³/h] | Example 6 | Example 7 | Comparative Example 1 |
|---|---|---|---|
| 100 | 35.5 | 54 | 31 |
| 180 | 60.5 | 94.5 | 51 |
| 200 | 67.5 | 109 | 57 |
| 300 | 110.5 | 186.5 | 92 |
| 400 | 164.5 | 286.5 | 132 |
| 500 | 218 | 411.5 | 185 |
| 600 | 285.5 | — | 238 |

TABLE 2

Test Results Of Gas Efficiency Test with N-Butane for Examples 6-7 and Comparative Example 1

| TIME [min] | Example 6 Efficiency [%] | Example 7 Efficiency [%] | Comparative Example 1 Efficiency [%] |
|---|---|---|---|
| 0.0 | 93 | 95 | 85 |
| 1.0 | 86 | 92 | 73 |
| 5.0 | 58 | 79 | 48 |
| 10.0 | 27 | 53 | 28 |
| 15.0 | 12 | 30 | 17 |

TABLE 3

Test Results Of Gas Efficiency Test with Toluene for Examples 6-7 and Comparative Example 1

| TIME [min] | Example 1 Efficiency [%] | Example 2 Efficiency [%] | Comparative Example 1 Efficiency [%] |
|---|---|---|---|
| 0.0 | 92 | 93 | 87 |
| 1.0 | 89 | 92 | 83 |
| 5.0 | 87 | 91 | 81 |
| 10.0 | 84 | 90 | 74 |
| 15.0 | 78 | 89 | 66 |

TABLE 4

Results Of Weight Measurement with Examples 3-4

| Example 3 Basis Weight of Ion Exchange Beads [g/m²] | Example 3 Basis Weight of Fibers [g/m²] | Example 4a Basis Weight of Ion Exchange Beads [g/m²] | Example 4a Basis Weight of Fibers [g/m²] |
|---|---|---|---|
| 810 g/m² | 86 g/m² | 545 g/m² | 60 g/m² |

Preparation of Composite Filters from Nonwoven Fibrous Webs Comprising Chemically Active Particulates with a Sub-Micrometer Fiber Cover Layer Example 9

Filtration Article

A composite filter was prepared using the activated carbon-containing nonwoven fibrous web of Example 1c (the amount of activated carbon was 420 g/m$^2$). A sub-micrometer fiber layer was deposited onto the lower surface of the activated carbon-containing nonwoven fibrous web of Example 1c (i.e. the surface from which the support layer was removed as described above) using a commercially available electrospinning apparatus, NANOSPIDER NS Roll to Roll Nanofiber Electrospinning Pilot Machine (available from Elmarco s.r.o Company, Nanodivision, Ruzodol, Czech Republic).

The activated carbon-containing nonwoven fibrous web of Example 1c (support layer removed) was exposed at its lower major surface to a stream of electrospun sub-micrometer fibers while being unwound from the input feeding (unwind) roller of the electrospinning apparatus, and was then wound up on the exit product take-up (wind) roller. The nonwoven fibrous web of Example 1c (support layer removed) was placed in contact with the counter-electrode of the electrospinning apparatus and pulled towards the exit roller.

200 ml of poly(vinyl) alcohol (PVA) polymer solution to be electrospun was prepared in a separate container by combining and mixing the following components:
1. 150 ml of PVA polymer solution @ 13% wt. in water (SLOVIOL R from Novacke Chemicke Zavody a.s., Novaky, Slovak Republic).
2. 49 ml of de-ionized (DI) water.
3. 1 ml of phosphoric acid @ 84% wt. (RECTAPUR from WWR International S.A.S, Fontenay sous Bois Cedex, France)

The resulting PVA solution was adjusted to a viscosity range of 600-800 mPa·s by addition of DI water. This PVA solution was poured into the pan of the electrospinning unit.

Figure 6E:

The following process conditions were applied to the electrospinning apparatus in order to apply a thin layer of PVA sub-micrometer fibers onto the lower major surface of the nonwoven fibrous web of Example 1c (after removing the support layer):
Line speed: 0.3 m/min
Roller electrode rotational speed: 0.2 RPM
Distance between roller electrode and counter-electrode: 11 cm The following electric field conditions were maintained between the roller electrode and the counter electrode:
Voltage: 72 kV
Output Current: 220 Amps The collected PVA sub-micrometer fiber-coated nonwoven fibrous web was subsequently formed into square samples having dimensions of 5×5 mm. The samples were visually inspected for checking the coating of the sub-micrometer PVA fiber layer on the activated carbon particulate-loaded nonwoven fibrous web. An Olympus Microscope type SZX12 (commercially available from Olympus, Inc. Center Valley, Pa.) with a camera head type Nikon Digital Sights DS Fil (commercially available from Nikon Instruments Europe B. V.) was used to produce photomicrographs. The resulting micrographs are shown in FIGS. 6D and 6E.

Figure 6F:
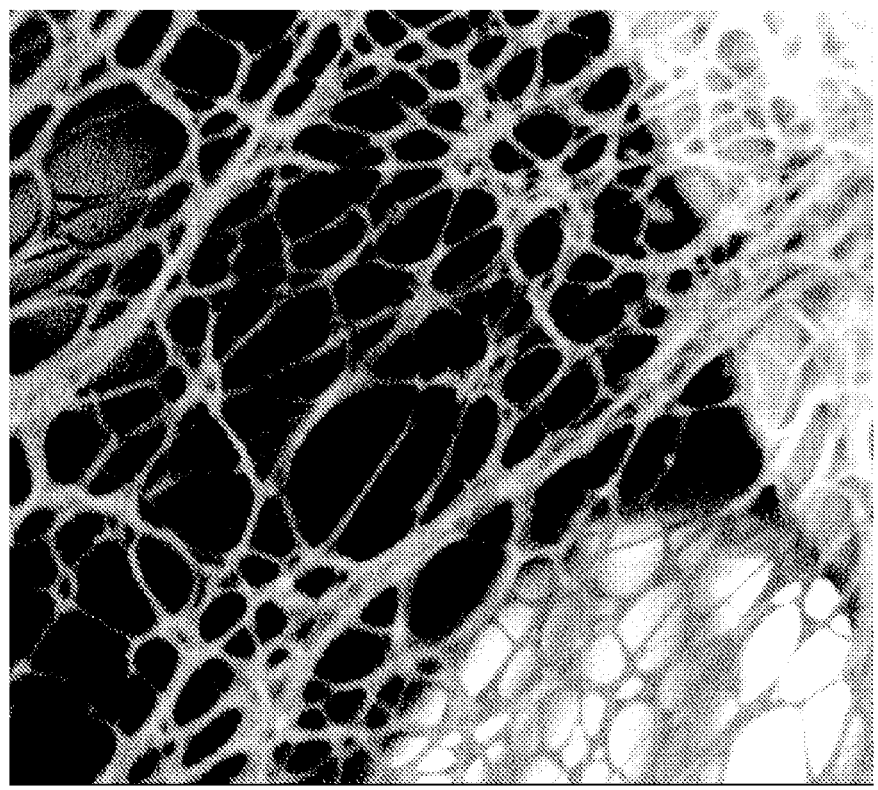

In addition, the same samples were visually inspected to determine the dimensions of the sub-micrometer PVA fibers. A scanning electron microscope (Phenom type, from FEI Company, Hillsboro, Oreg.) was used with a magnification of 11,400 times. PVA sub-micrometer fibers with median fiber diameters in the range from 50 nanometers (nm) to 200 nm were observed in the micrograph shown in FIG. 6F.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

The invention claimed is:

1. A nonwoven fibrous web comprising:
a plurality of randomly oriented discrete fibers, wherein the plurality of randomly oriented discrete fibers comprise discontinuous multi-component fibers that comprise at least a first region having a first melting temperature and a second region having a second melting temperature, wherein the first melting temperature is less than the second melting temperature; and
a plurality of chemically active particulates, wherein at least a portion of the chemically active particulates are bonded to the at least first region of at least a portion of the multi-component fibers, and
further wherein at least a portion of the discrete fibers are bonded together at a plurality of intersection points with the first region of the multi-component fibers; and wherein the multi-component fibers are comprised in the nonwoven fibrous web in an amount greater than 0% and less than 10% by weight of the total weight of the nonwoven fibrous web, further wherein greater than 0% and less than 10% by weight of the plurality of randomly oriented discrete fibers are multi-component fibers.

2. A nonwoven fibrous web of claim 1, wherein the multi-component fibers are bi-component fibers.

3. A nonwoven fibrous web of claim 1, wherein the multi-component fibers comprise a polymer selected from the group consisting of polyester, polyamide, polyolefin, cyclic polyolefin, polyolefinic thermoplastic elastomers, poly(meth)acrylate, polyvinyl halide, polyacrylonitrile, polyurethane, polylactic acid, polyvinyl alcohol, polyphenylene sulfide, polysulfone, polyoxymethylene, fluid crystalline polymer, and combinations thereof.

4. A nonwoven fibrous web of claim 1, wherein the first melting temperature is at least 50° C., and further wherein the second melting temperature is at least 10° C. greater than the first melting temperature.

5. A nonwoven fibrous web of claim 4, wherein the first melting temperature is at least 100° C., and further wherein the second melting temperature is at least 30° C. greater than the first melting temperature.

6. A nonwoven fibrous web of claim 1, wherein at least a portion of the plurality of randomly oriented discrete fibers is selected from the group consisting of natural fibers, non-thermoplastic polymeric fibers, carbon fibers, ceramic fibers, metal fibers, and combinations thereof.

7. A nonwoven fibrous web of claim 1, wherein at least a portion of the plurality of randomly oriented discrete fibers comprise polypropylene, polyethylene, polyester, polyethylene terephthalate, polybutylene terephthalate, polyamide, polyurethane, polybutene, polylactic acid, polyvinyl alcohol, polyphenylene sulfide, polysulfone, fluid crystalline polymer, polyethylene-co-vinylacetate, polyacrylonitrile, cyclic polyolefin, polyoxymethylene, polyolefinic thermoplastic elastomers, or a combination thereof.

8. The nonwoven fibrous web of claim 1, wherein at least 10% wt. of the nonwoven fibrous web comprises chemically active particulates.

9. The nonwoven fibrous web of claim 1, wherein the chemically active particulates are selected from the group consisting of sorbent particulates, dessicant particulates, metal particulates, biocide particulates, microcapsules, and combinations thereof.

10. The nonwoven fibrous web of claim 1, wherein the chemically active particulates are selected from the group consisting of activated carbon particulates, activated alumina particulates, silica gel particulates, anion exchange resin particulates, cation exchange resin particulates, molecular sieve particulates, diatomaceous earth particulates, anti-microbial compound particulates, and combinations thereof.

11. The nonwoven fibrous web of claim 1, wherein the chemically active particulates are distributed substantially throughout an entire thickness of the nonwoven fibrous web.

12. The nonwoven fibrous web of claim 1, wherein the chemically active particulates are distributed substantially on a major surface of the nonwoven fibrous web.

13. The nonwoven fibrous web of claim 1, wherein the nonwoven fibrous web is substantially free of any additional binder.

14. The nonwoven fibrous web of claim 1, further comprising a binder coating covering at least a portion of the plurality of randomly oriented discrete fibers, wherein the binder does not substantially occlude a surface of the chemically active particulates.

15. The nonwoven fibrous web of claim 1, further comprising a support layer selected from the group consisting of a screen a scrim, a mesh, a nonwoven fabric, a woven fabric, a knitted fabric, a foam layer, a porous film, a perforated film, an array of filaments, a melt-fibrillated fibrous web, a meltblown fibrous web, a spun bond fibrous web, an air-laid fibrous web, a wet-laid fibrous web, a carded fibrous web, a hydro-entangled fibrous web, and combinations thereof.

16. The nonwoven fibrous web of claim 1, further comprising a fibrous cover layer consisting of a plurality of microfibers, a plurality of sub-micrometer fibers, and combinations thereof.

17. The nonwoven fibrous web of claim 16, wherein the fibrous cover layer comprises a population of sub-micrometer fibers having a median fiber diameter of less than 1 μm formed by melt blowing, melt spinning, electrospinning, plexifilament formation, gas jet fibrillation, fiber splitting, or a combination thereof.

18. A method of making a nonwoven fibrous web comprising:
providing a forming chamber having an upper end and a lower end;
introducing a plurality of discrete fibers into the upper end of the forming chamber, wherein greater than 0% and less than 10% by weight of the discrete fibers is comprised of discontinuous multi-component fibers;
introducing a plurality of chemically active particulates into the forming chamber;
mixing the plurality of discrete fibers with the plurality of chemically active particulates within the forming chamber to form a fibrous particulate mixture;
transporting the fibrous particulate mixture to the lower end of the forming chamber to form a nonwoven fibrous web; and
securing the chemically active particulates to the nonwoven fibrous web, wherein more than 0% and less than 10% wt. by weight of the nonwoven fibrous web is comprised of the multi-component fibers, further wherein each multi-component fiber is comprised of at least a first region having a first melting temperature and a second region having a second melting temperature, wherein the first melting temperature is less than the second melting temperature, and wherein securing the chemically active particulates to the nonwoven fibrous web comprises heating the multi-component fibers to a temperature of at least the first melting temperature and less than the second melting temperature, whereby at least a portion of the chemically active particulates are secured to the nonwoven fibrous web by bonding to the at least first region of at least a portion of the multi-component fibers, and at least a portion of the discrete fibers are bonded together at a plurality of intersection points with the first region of the multi-component fibers.

* * * * *